United States Patent [19]
Kaneda et al.

[11] Patent Number: 5,621,527
[45] Date of Patent: Apr. 15, 1997

[54] APPARATUS FOR MEASURING RELATIVE DISPLACEMENT BETWEEN THE APPARATUS AND A SCALE WHICH A GRATING IS FORMED

[75] Inventors: Yasushi Kaneda, Tokyo; Koh Ishizuka, Ohmiya, both of Japan

[73] Assignee: Canon Kabushiki Kaisha, Tokyo, Japan

[21] Appl. No.: 311,854

[22] Filed: Sep. 26, 1994

[30] Foreign Application Priority Data

Sep. 29, 1993 [JP] Japan .................................. 5-265764

[51] Int. Cl.⁶ ............................................................ G01B 9/02
[52] U.S. Cl. ...................................... 356/356; 250/237 G
[58] Field of Search ....................... 356/356; 250/237 G, 250/231.13–231.18

[56] References Cited

U.S. PATENT DOCUMENTS

| | | | |
|---|---|---|---|
| 4,829,342 | 5/1989 | Nishimura | 356/356 |
| 5,283,434 | 2/1994 | Ishizuka et al. | 250/237 G |
| 5,390,022 | 2/1995 | Ishizuka et al. | 356/356 |
| 5,448,358 | 9/1995 | Ishizuka et al. | 356/373 |
| 5,481,106 | 1/1996 | Nyui et al. | 250/237 G |
| 5,483,377 | 1/1996 | Kaneda et al. | 250/237 G |

FOREIGN PATENT DOCUMENTS

| | | | |
|---|---|---|---|
| 3905838 | 8/1989 | Germany | G01D 5/38 |
| 62-121314 | 6/1987 | Japan . | |
| 1180615 | 12/1989 | Japan . | |
| 3279812 | 12/1991 | Japan . | |
| 1474049 | 5/1977 | United Kingdom . | |

OTHER PUBLICATIONS

OPTIK, vol. 85, No. 2, Jul. 1990, Stuttgart De, pp. 47–52. A.G. Sedukhin, "Diffraction Reticles: The Capabilities of Novel Optical Components For Displacement or Distance Measurement".

*Primary Examiner*—Frank Gonzalez
*Assistant Examiner*—Amanda Merlino
*Attorney, Agent, or Firm*—Fitzpatrick, Cella, Harper & Scinto

[57] ABSTRACT

An apparatus for measuring the relative displacement information between it and a scale on which a diffraction grating is formed has a light source, a separating device for separating a light beam from the light source into a plurality of light beams, a wave combining device for wave-combining the diffracted lights of the plurality of light beams separated by the separating device which are diffracted by the diffraction grating, a light receiver for receiving the interfering lights by the plurality of light beams wave-combined by the wave combining device, the relative displacement information between the apparatus and the scale being measured by the light reception of the light receiver, and an optical device adapted to collimate the plurality of light beams or to form a spherical wave having so large a radius of curvature that it can be regarded as a plane wave of the plurality of light beams in the direction of light beam separation of the separating device and to condense the plurality of light beams in the optical path from the separating device to the wave combining device in a direction perpendicular to the direction of light beam separation.

20 Claims, 22 Drawing Sheets

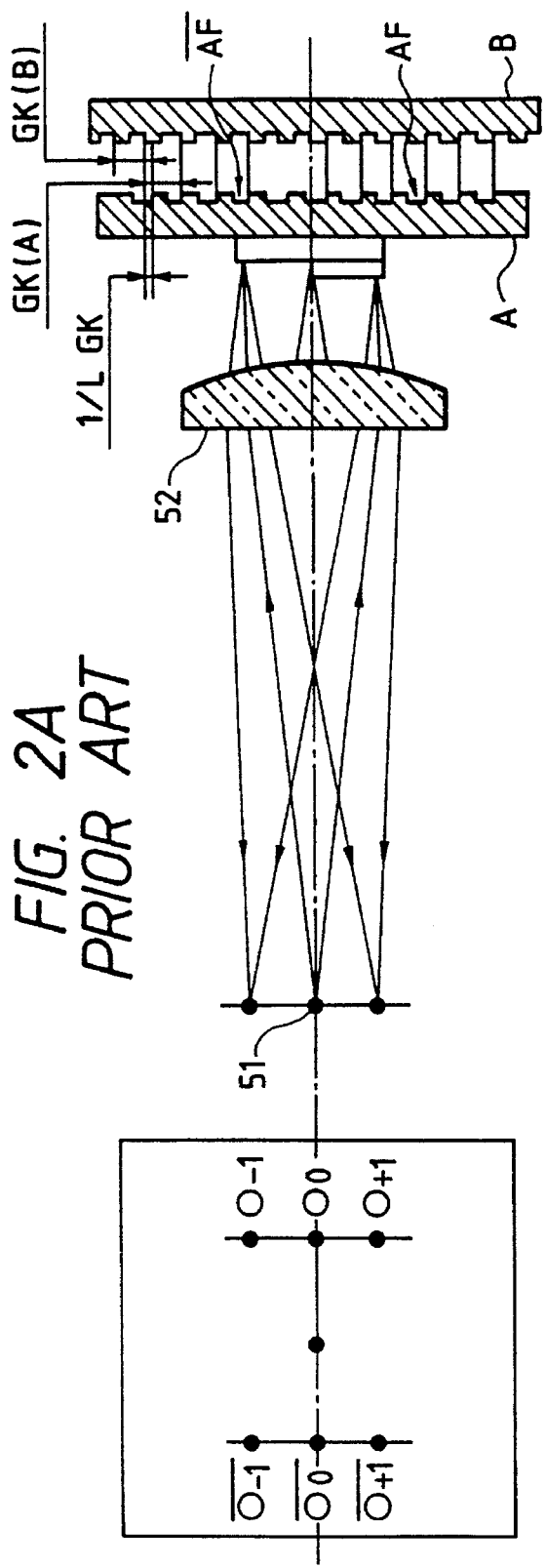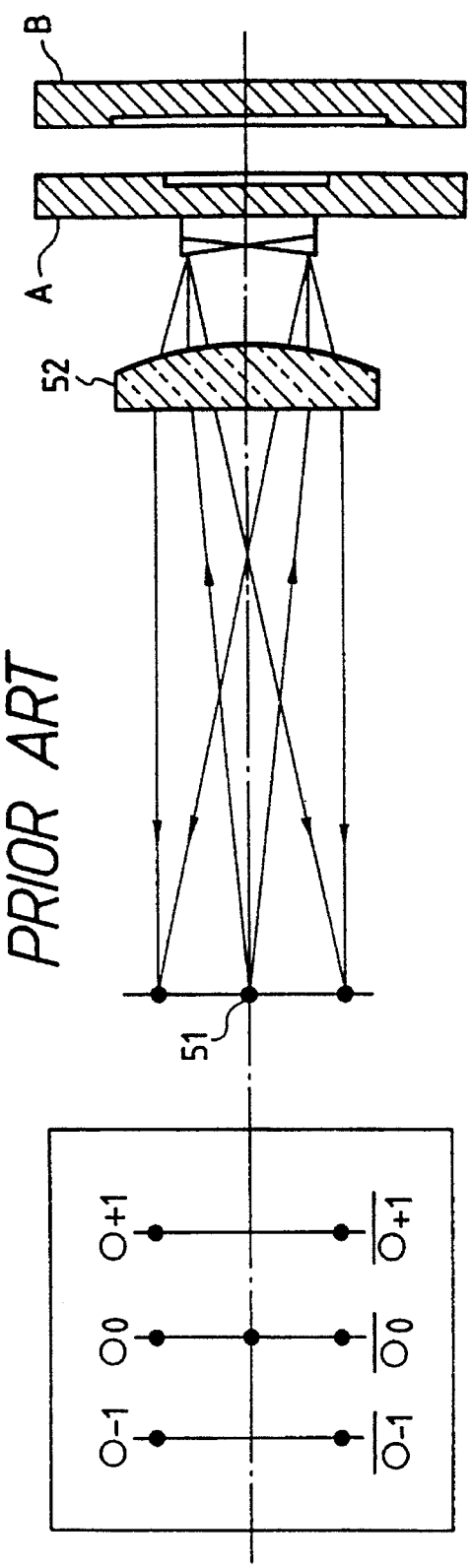

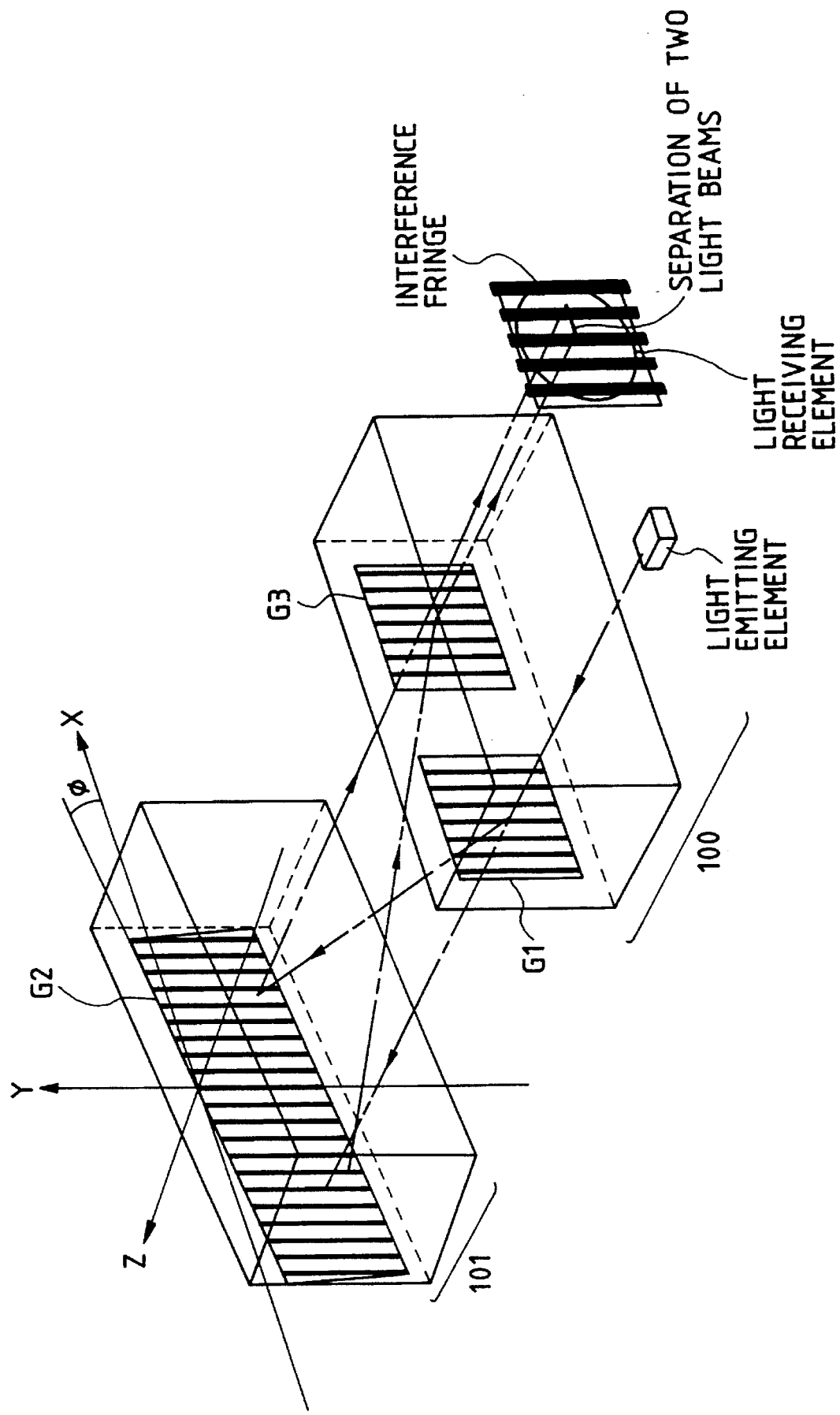

SPHERICAL WAVE

PLANE WAVE

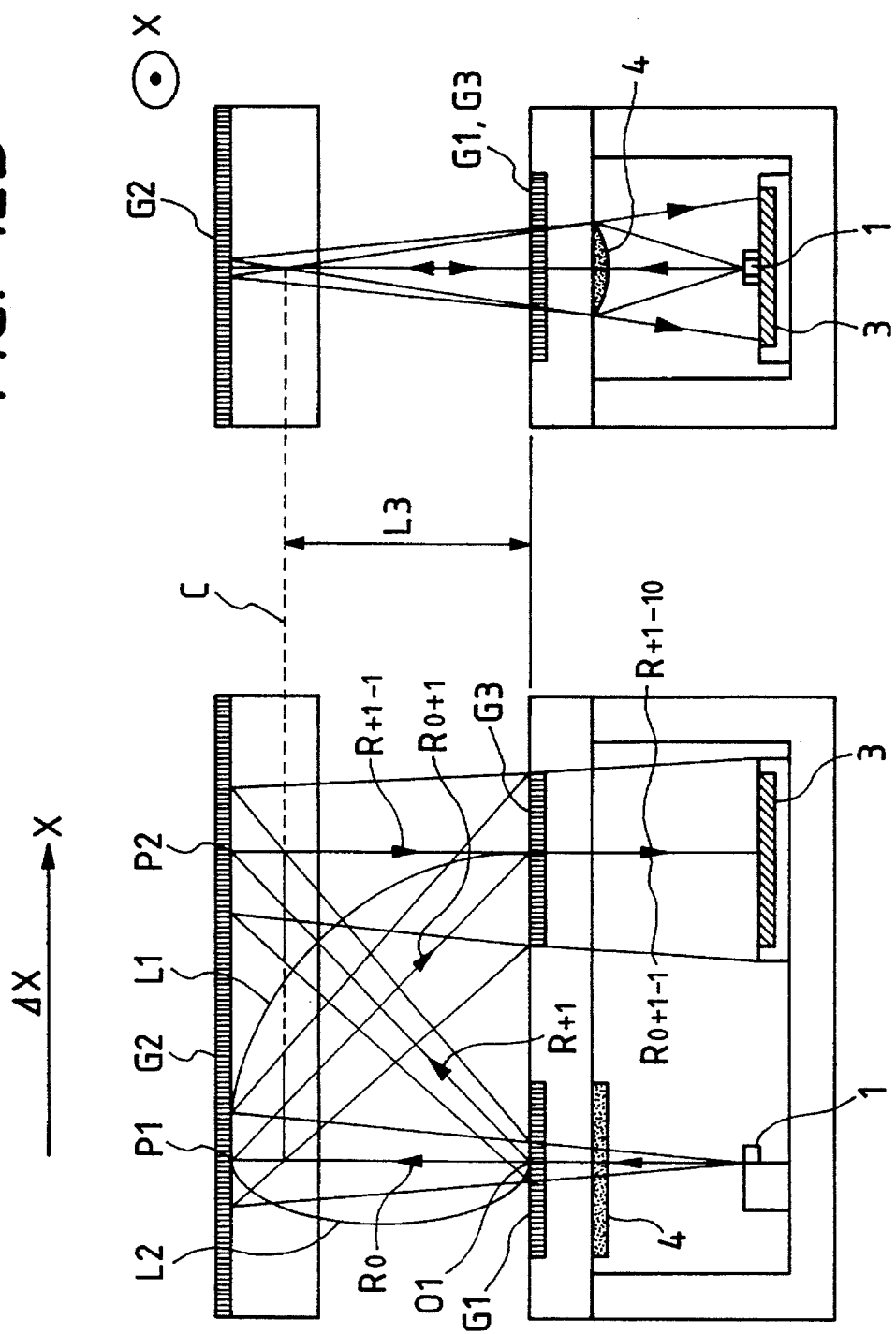

5,621,527

APPARATUS FOR MEASURING RELATIVE DISPLACEMENT BETWEEN THE APPARATUS AND A SCALE WHICH A GRATING IS FORMED

BACKGROUND OF THE INVENTION

1. Field of the Invention

This invention relates to an optical type displacement sensor for finding a physical amount such as the amount of movement or displacement of an object highly accurately by the utilization of the fact that interfering light beams are modulated by diffraction and interference occurring when light is applied to the object.

2. Related Background Art

Optical type displacement sensors of this type according to the prior art include optical encoders, laser Doppler speed meters, laser interferometers, etc. and these are highly accurate and have high resolving power, but in order that they may be applied to a wider field, compactness (a size of the order of millimeters), higher accuracy, higher resolving power (of the order of 0.1 μm) and high stability are required of them. A sensor of a size of millimeters could be directly attached to an object to be measured for use and therefore could also be used in a compact apparatus, but is liable to cause an attaching error and thus, it becomes necessary to cope with it.

As the prior art effective for miniaturizing in the field of such a detecting apparatus utilizing light, there are the following.

FIGS. 1A and 1B of the accompanying drawings are illustrations of an optical encoder disclosed in Japanese Laid-Open Utility Model Application No. 1-180615. A light beam diverging from a light emitting element 42 passes through an aperture 46A in a base plate 46, is converted into a linear ray array by a slit array 14 and is applied to a grating on a scale 40, whereupon the grating of the scale 40 is projected onto an index grating 16 by a light beam reflected from the bottom 12 of the scale 40, and the quantity of light entering a light receiving element 48 on the base plate 46 is modulated by the geometrical superposition of the two. This is the principle of this optical encoder. According to this principle, downsizing is possible, but resolving power is limited.

FIGS. 2A and 2B of the accompanying drawings are illustrations of an optical type encoder disclosed in Japanese Laid-Open Patent Application No. 62-121314, and this encoder is an effective example of an improved construction for downsizing the basic optical system (British Laid-Open Patent No. 1,474,049) of an encoder using three diffraction gratings. A light beam diverging from a light emitting element 51 is made into a parallel light beam by a lens 52, and is diffracted when it is applied to a grating GK(A) on an index scale A, and creates light beams in three directions of emergence.

Each light beam is diffracted by a grating GK(B) on a scale B, is subjected to phase modulation by relative movement and is returned to the grating GK(A) on the index scale A, and three sets of interfering light beams are caused to enter light receiving elements provided in different azimuths, by the diffraction by the index grating. By this construction, compactness and high resolving power are made compatible.

FIG. 3 of the accompanying drawings are illustrations of an optical type encoder disclosed in Japanese Laid-Open Patent Application No. 3-279812, and this encoder is an example which is effective to achieve high accuracy, simplicity and compactness at a time. In FIG. 3, the reference numeral 61 designates a light emitting element, the reference numeral 62 denotes a lens, the reference characters 63, $63_{1a}$, $63_{1b}$ and 64 designate diffraction gratings, and reference characters 65a and 65b denote light receiving elements. The letter L designates an incident ray of light, and rays of light denoted by L( ) are diffracted lights. The reference characters 1a and 1b denote the interfering light beams of diffracted lights finally emerging from the diffraction gratings $63_{1a}$ and $63_{1b}$. These interfering light beams are detected by the light receiving elements 65a and 65b, respectively, whereby the amount of relative displacement between the diffraction gratings can be detected.

However, the encoders according to the prior art as optical type displacement sensors are all made compact and highly accurate, but they suffer from the following problems.

(1) The light emitted from the light emitting element is horizontally divided into two or more and the interfering light beams thereof are received by the photoelectric element. Thus, it is very difficult to adjust all of the interfering states of the interfering light beams combined by the diffraction gratings into equal constant states. Therefore, the amplitude and phase difference of the signal obtained between different interference areas are not stable.

(2) The light beams divided in one and the same interfering light beam become more liable to fluctuate in their interfering state due to the influence of an attaching error as the resolving power of the main body is more improved, and the phase difference outputted from each phase becomes unstable. As long as such a construction is adopted, it is practically difficult to construct a displacement sensor of high resolving power.

SUMMARY OF THE INVENTION

It is an object of the present invention to solve the above-noted problems peculiar to the prior art and to provide an optical type displacement sensor of high resolving power which is resistant to variations in interfering state.

Other objects of the present invention will become apparent from the following detailed description of some embodiments of the invention.

BRIEF DESCRIPTION OF THE DRAWINGS

FIGS. 2A and 2B are illustrations of another optical encoder according to the prior art.

FIG. 7 shows a state in which interference fringes are created due to the attaching error of the rotation angles of the head portion and the scale portion.

FIGS. 12A and 12B are a top plan view and a side view, respectively, showing an optical path in Embodiment 1.

DETAILED DESCRIPTION OF THE PREFERRED EMBODIMENTS

Description will first be made of a technique which is the premise of the present invention.

Figure 1A:
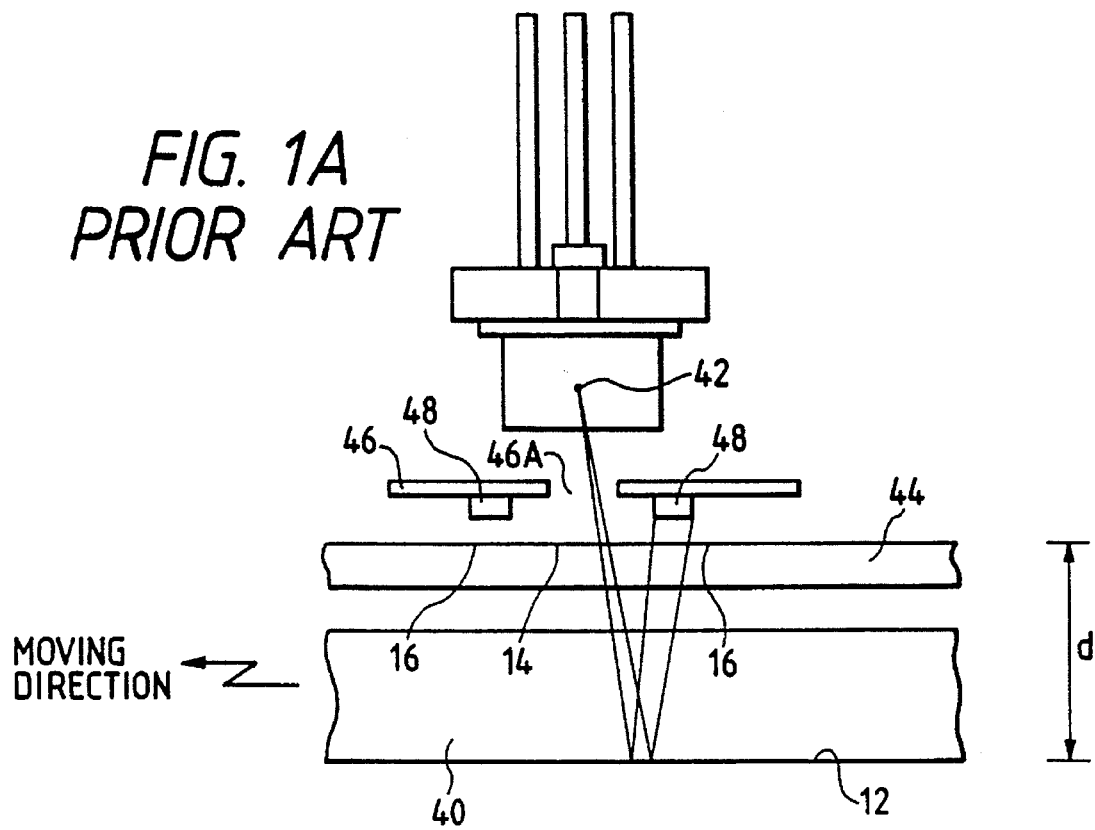
FIGS. 1A and 1B are illustrations of an optical encoder according to the prior art.
Figure 1B:
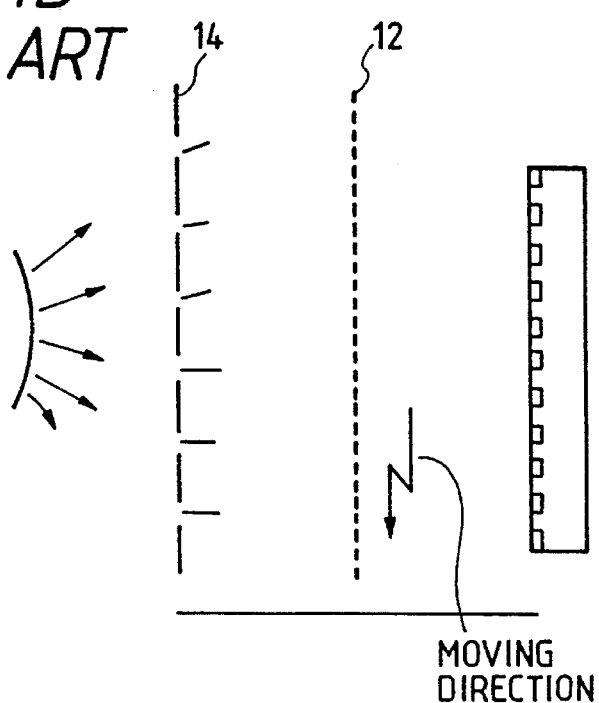
Figure 3:
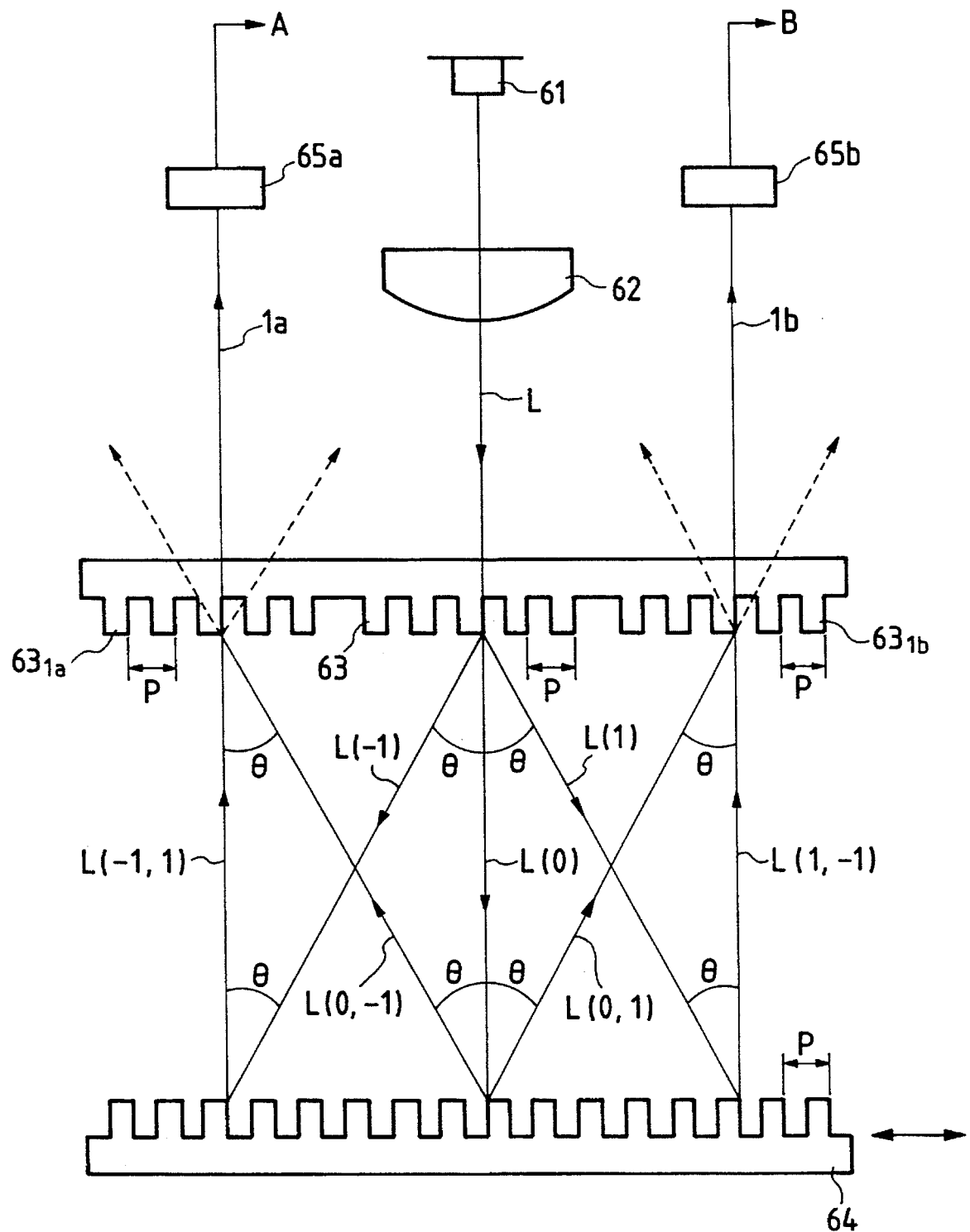
FIG. 3 is an illustration of still another optical encoder according to the prior art.

Description will hereinafter be made, with reference to FIG. 4, of the fluctuation of the interfering state by the attaching error of a head portion 100 provided with light projecting means (a light emitting element and a diffraction grating G1) and light receiving means (a diffraction grating G3 and a light receiving element) and a scale portion 101 provided with a diffraction grating G2 when three diffraction gratings are used as in the prior-art optical type encoder shown in FIG. 3. Light beams travel in the direction of the arrow along optical paths indicated by dot-and-dash lines, are combined and interfere with each other by diffraction gratings G3 and are detected by the light receiving element.

Figure 4:
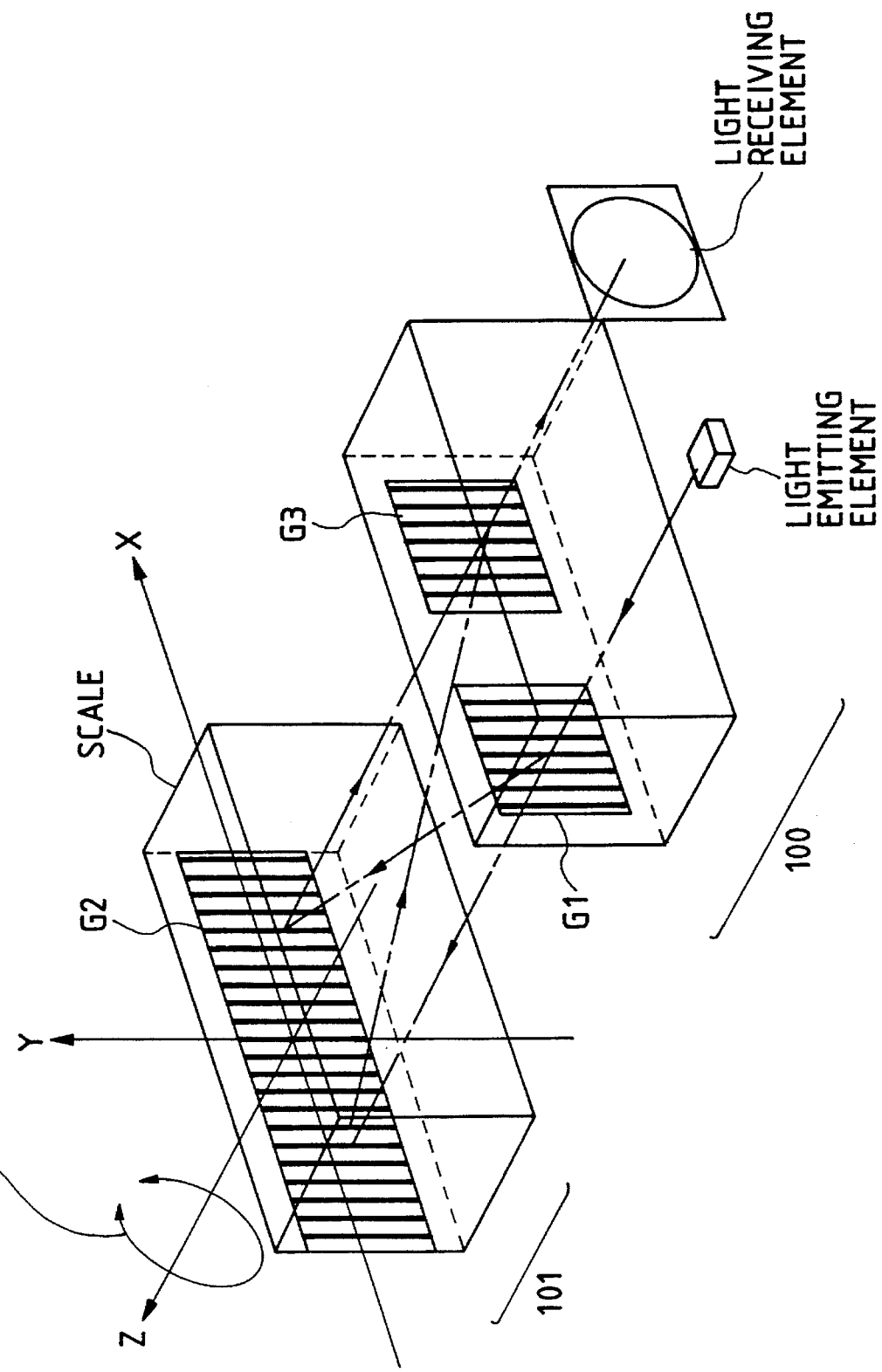
FIG. 4 shows the direction of an azimuth angle.
Figure 5:
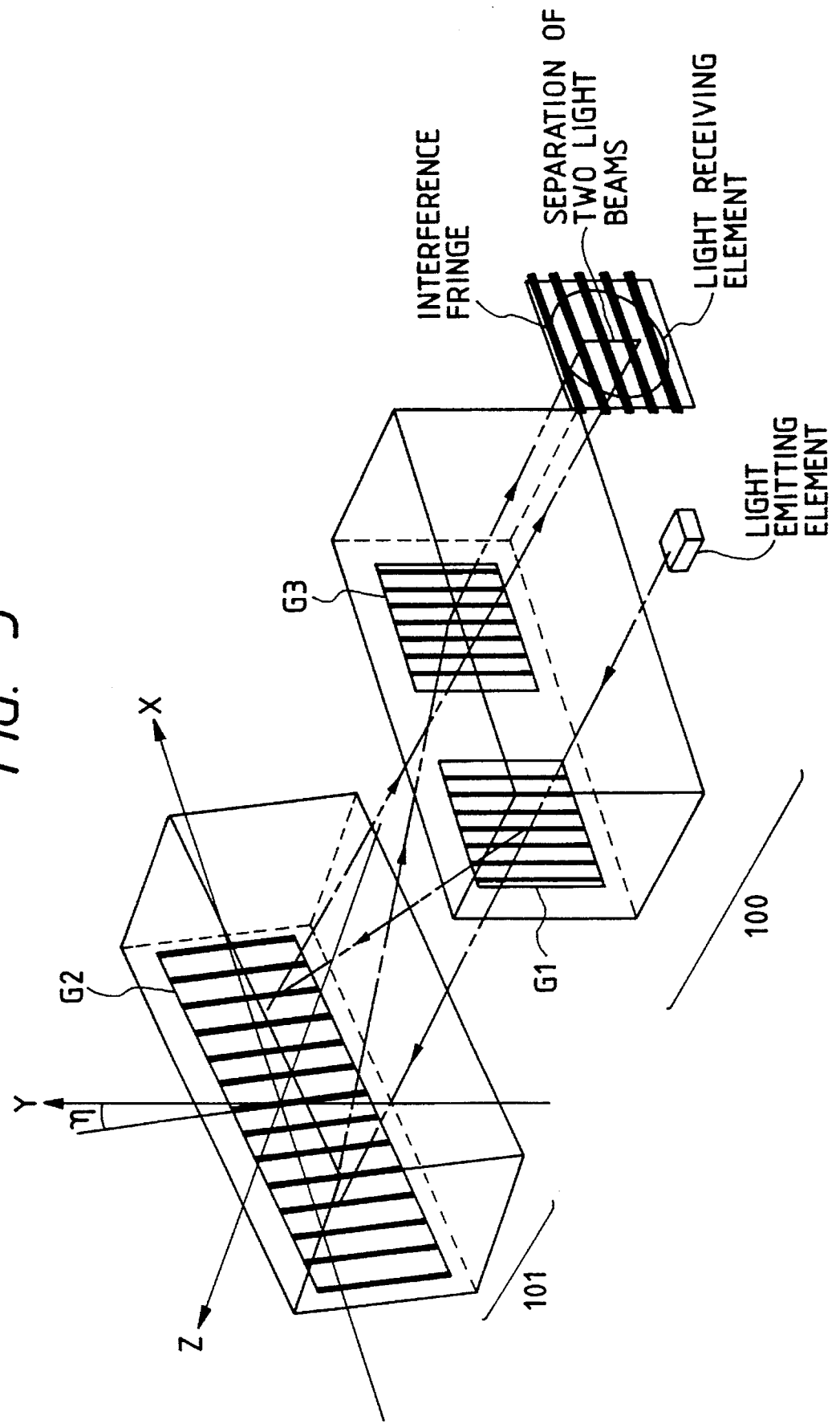
FIG. 5 shows a state in which interference fringes are created due to the attaching error of the azimuth angles of a head portion and a scale portion.
Figure 6:
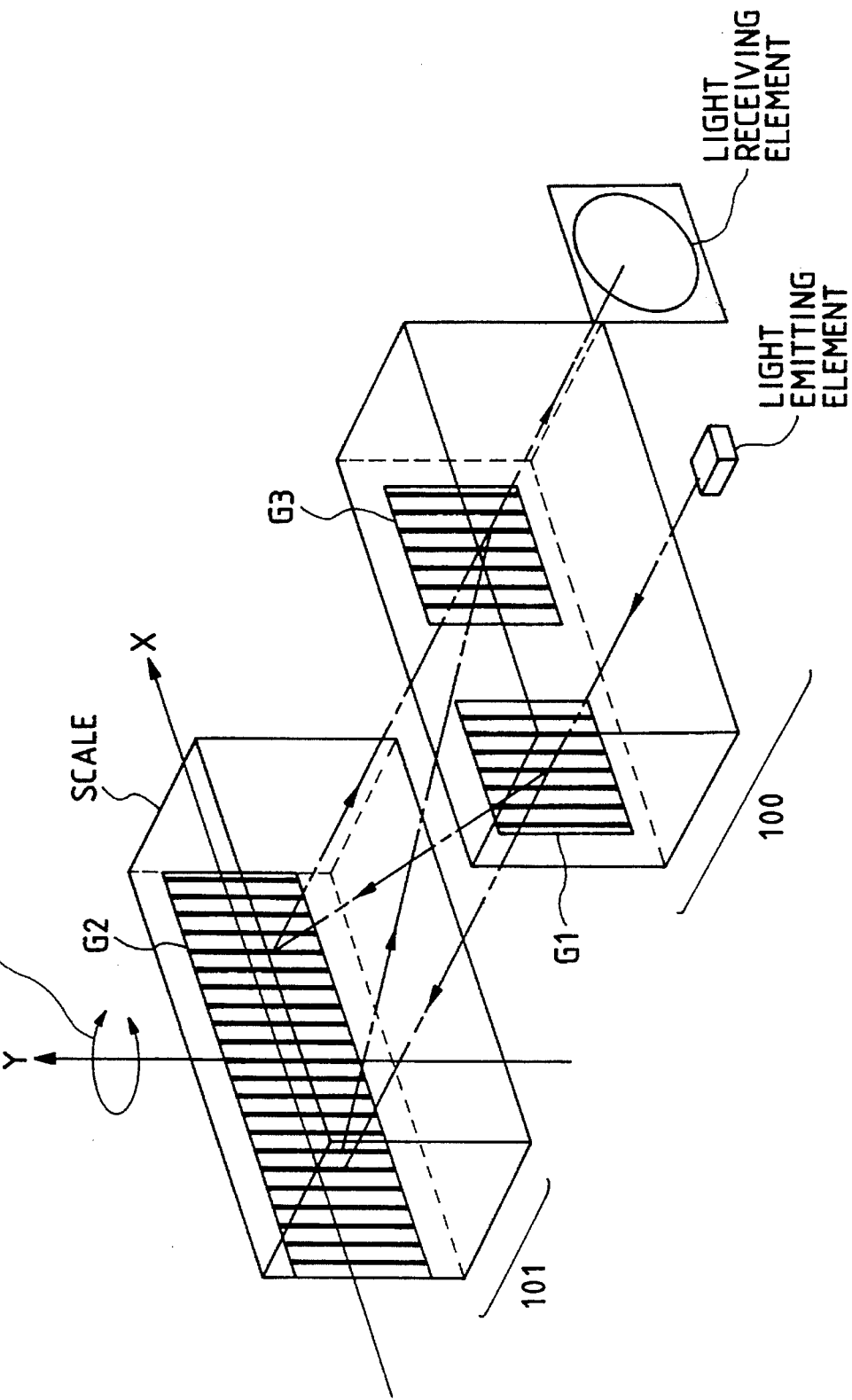
FIG. 6 shows the direction of a rotation angle.

When an attaching error about the z-axis occurs in the arrangement as shown in FIG. 4, interference fringes as shown in FIG. 5 are created on the light receiving element and further, when an attaching error about the y-axis as shown in FIG. 6 occurs, interference fringes as shown in FIG. 7 are created. Hereinafter, the rotation angle of the attaching error as shown in FIG. 4 will be called "azimuth angle ($\eta$)" and the rotation angle of the attaching error as shown in FIG. 6 will be called "rotation angle ($\phi$)".

Figure 8B:
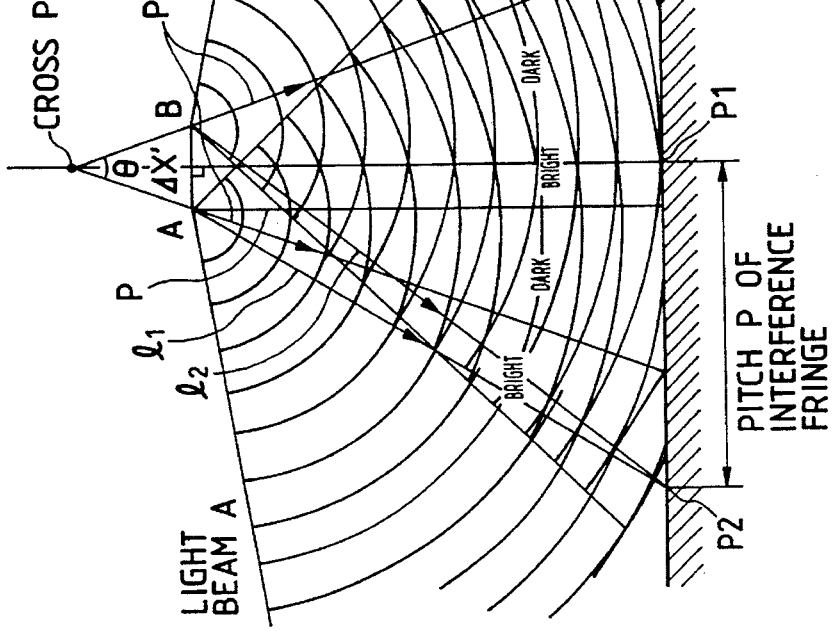
FIGS. 8A and 8B show the difference in interference between a parallel wave and a spherical wave.
Figure 8A:
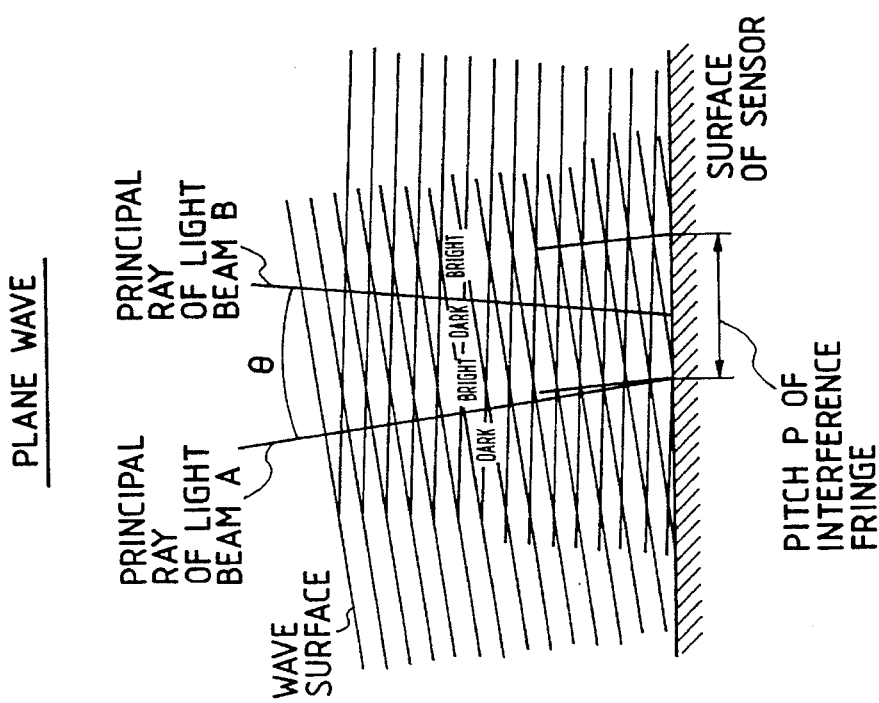

It is known that in the interference between two light beams shown in FIGS. 8A and 8B, when the two light beams are plane waves (parallel lights) or spherical waves having a very great radius of curvature, the patch P of the interference fringes is determined by the angle $\theta$ between the principal rays of the two light beams and the wavelength $\lambda$ of the rays, and the relation therebetween is $$P=\lambda/(2\sin[\theta/2]).$$

Also, when the interfering two light beams are spherical waves not large in radius of curvature, the pitch P of the interference fringes is varied by the distances from the condensing points (A and B) of the two light beams to the sensor (observation surface), independently of the angle $\theta$ between the principal rays of the interfering two light beams, and depends on the optical path lengths l1 and l2 from the condensing points (A and B) of the two light beams and the wavelength $\lambda$ of the lights. When at this time, the difference $\Delta l$ ($\Delta l = l1-l2$) between the optical path lengths l1 and l2 is an integer multiple of the wavelength, the lights strengthen each other (become bright) on the surface of the sensor, and when the difference $\Delta l$ is at integer multiple of the wavelength, plus a half wavelength, the lights weaken each other (become dark). In the case as shown in FIGS. 8A and 8B, $\Delta l$ is 0 at a point P1 on the surface of the sensor, and is $\lambda$ at a point P2 on the surface of the sensor.

When the interval between them is the pitch P of the interference fringes, the relation between the optical path lengths l1, l2 and the wavelength $\lambda$ is $$P=\lambda(l2+l1)/2\Delta x.$$

Figure 9A:
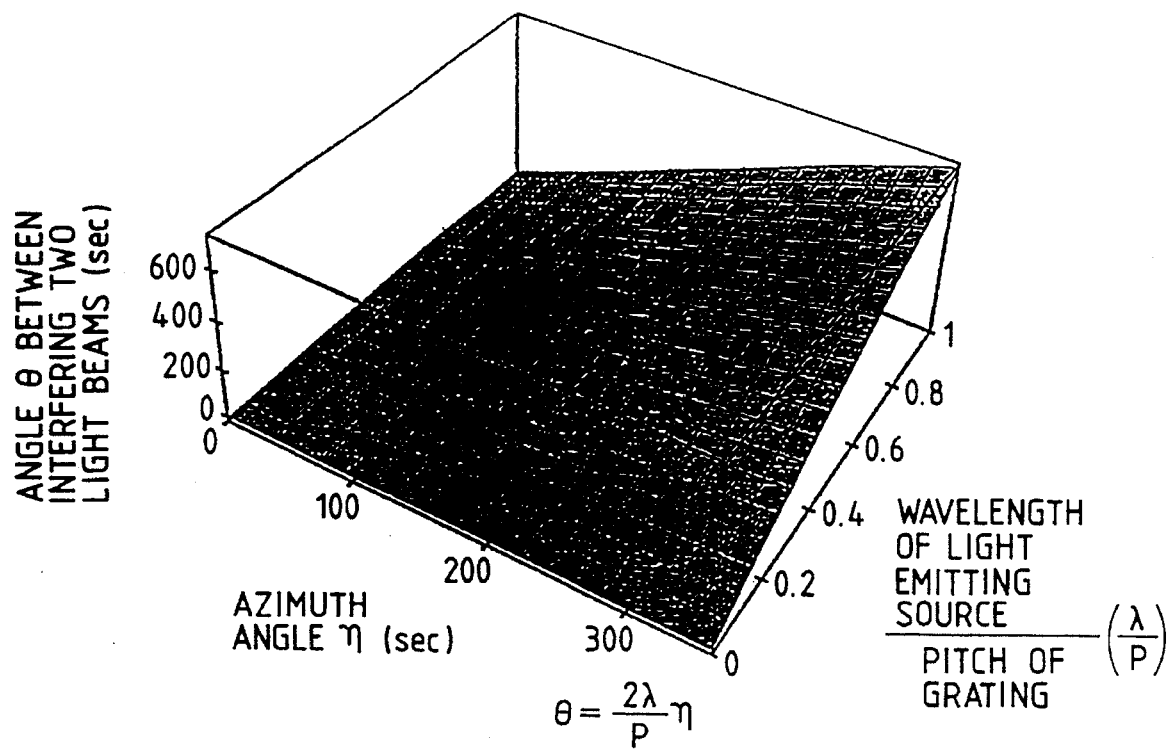
FIGS. 9A and 9B show the relation (of the wavelength/the pitch of a grating) between the angle difference between interfering two light beams and the azimuth angle when the head portion and the scale portion give rise to the attaching error of the azimuth angle.
Figure 9B:
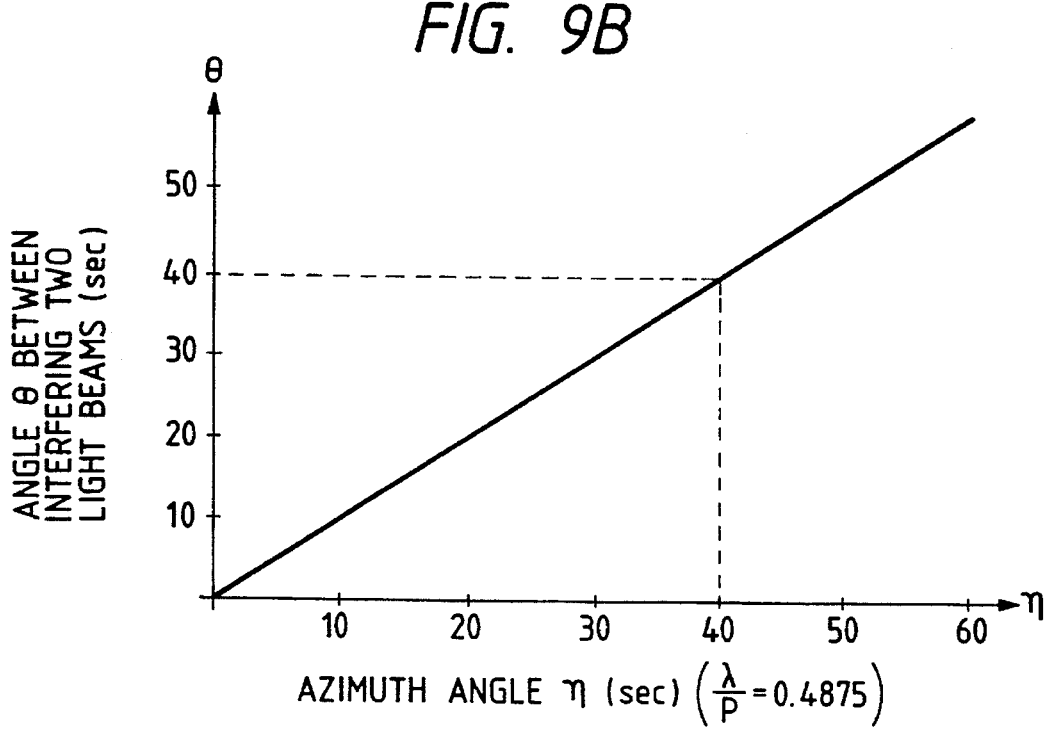
Figure 10A:
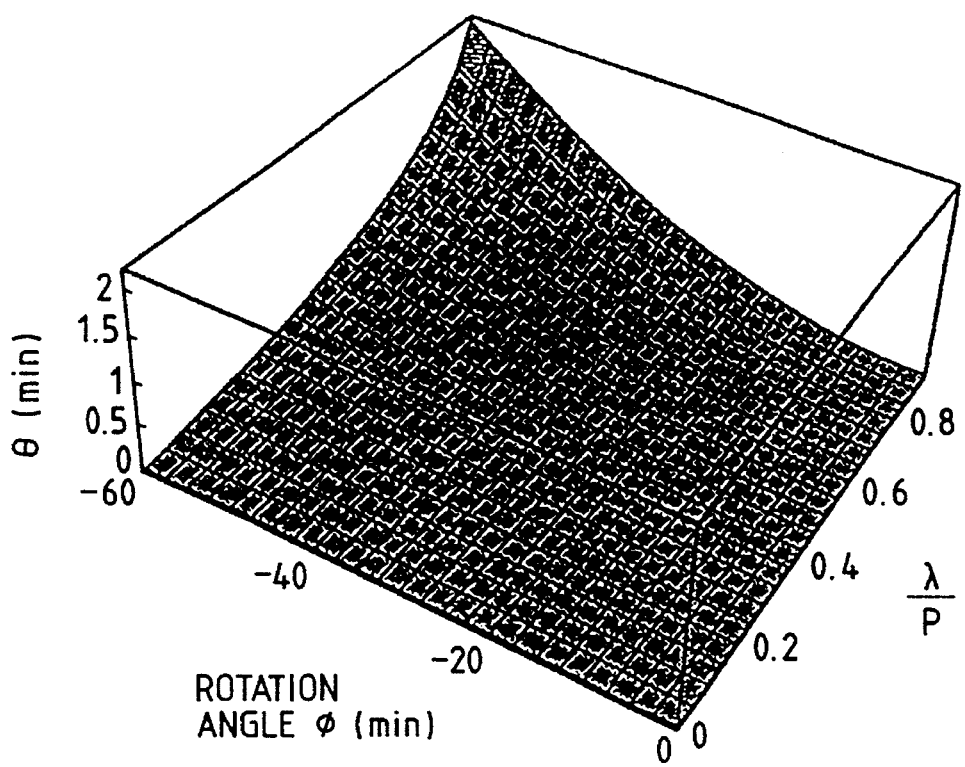
FIGS. 10A and 10B show the relation (of the wavelength/ the pitch of the grating) between the angle difference between interfering two light beams and the azimuth angle when the head portion and the scale portion give rise to the attaching error of the rotation angle.
Figure 10B:
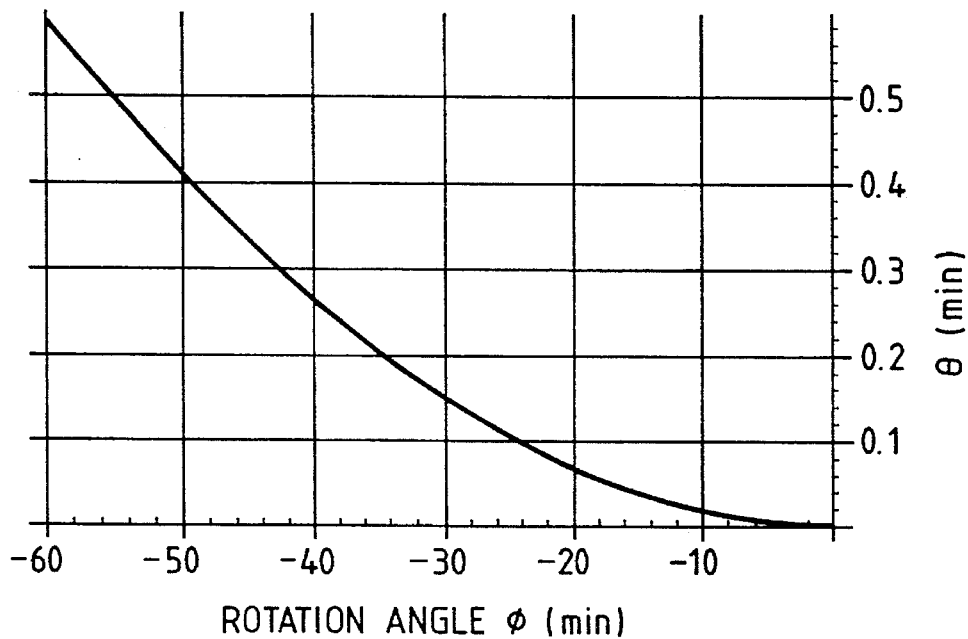

The angle difference between the interfering two light beams becomes such as shown in FIGS. 9A and 9B due to the attaching error of the azimuth angle of FIG. 4, and the angle difference between the interfering two light beams becomes such as shown in FIGS. 10A and 10B due to the attaching error of the rotation angle of FIG. 6. When parallel lights are used, the angle difference between the interfering two light beams is little (1/100 or less of the attaching error angle) with respect to the attaching error of the rotation angle of FIG. 6, but the angle difference between the interfering two light beams becomes such as shown in FIGS. 9A and 9B due to the attaching error of the azimuth angle of FIG. 4 and the interfering state becomes unstable. For example, when the period of the diffraction grating is 1.6 $\mu$m, the wavelength of the light is 0.78 $\mu$m, the size of the sensor is 1 mm×1 mm, and the azimuth angle is of the order of 40 seconds, the angle difference between the two light beams becomes of the same order of 40 seconds (FIG. 9B) and the output decreases by 10%.

Description will hereinafter be made of some embodiments thought out in view of the above-described technique.

[Embodiment 1]

Figure 11:
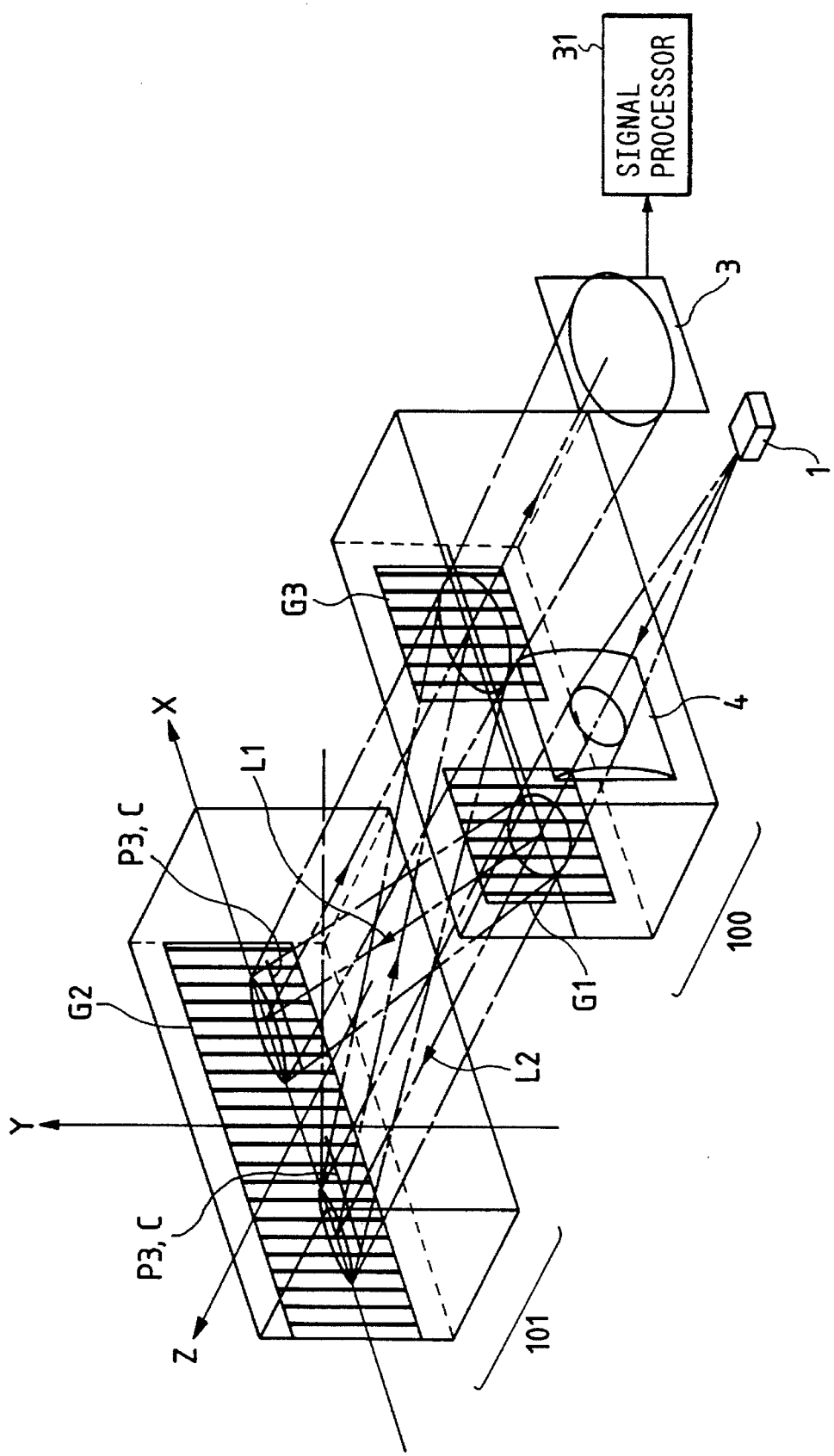
FIG. 11 is a perspective view showing Embodiment 1 of an optical type displacement sensor according to the present invention.

FIG. 11 is a perspective view showing Embodiment 1 of an optical type displacement sensor according to the present invention, and FIGS. 12A and 12B are a top plan view and a side view, respectively, showing an optical path in Embodiment 1. In FIGS. 11, 12A and 12B, the reference numeral 1 designates a light emitting element, the reference numeral 3 denotes a light receiving element, the reference character G1 designates a first diffraction grating for dividing a divergent light beam, the reference character G2 denotes a second diffraction grating which is a scale for phase-modulating the divided light beams, the reference character G3 designates a third diffraction grating for combining the light beams, and the reference numeral 4 denotes a cylindrical lens for condensing the light beams only in the direction of the grating lines of the first diffraction grating G1.

A head portion 100 having the light emitting element 3 and the first and third diffraction gratings G1 and G3 constitutes light projecting means, and a scale portion 101 having the second diffraction grating G2 constitutes modulating means. The reference numeral 31 designates a signal processor for receiving a signal from the light receiving element 3 and detecting displacement information such as the amount of relative displacement of the light projecting means 100 and the scale portion 101.

The principle of Embodiment 1 will hereinafter be described. A divergent light beam emitted from the light emitting element 1 is converted into such a wave surface state that, in the direction of the grating lines of the first diffraction grating G1, it is made into converged light by the cylindrical lens 4, and in the direction of the grating arrangement of the first diffraction grating G1, it becomes the divergent light from the light source. The light beam is transmitted and diffracted at a point 01 on the first diffraction grating G1, and is divided into 0-order diffracted light R0, +1st-order diffracted light R+1 and −1st-order diffracted light R−1, and only the 0-order diffracted light R0 and the 1st-order diffracted light R+1 are utilized.

The light beam R0 which has rectilinearly travelled through the first diffraction grating G1 is reflected and diffracted at a point P1 on the second diffraction grating G2 and is divided into +1st-order diffracted light R0+1 and −1st-order diffracted light R0−1, which are phase-modulated, and of these, only the +1st-order diffracted light R0+1 is utilized, and the phase of the +1st-order diffracted light R0+1 shifts by $+2\pi\Delta x/P$, where $\Delta x$ is the amount of movement of the second diffraction grating G2 and P is the pitch of the second diffraction grating G2.

The +1st-order diffracted light R0+1 is once condensed at a position C in the direction of the grating lines of the first diffraction grating G1, is transmitted through and diffracted by the third diffraction grating G3, and is divided into 0-order diffracted light R0+10, −1st-order diffracted light R0+1−1 and other light beams, of which the −1st-order diffracted light R0+1−1 is taken out perpendicularly to the surface of the diffraction grating, and the phase of the wave surface is $+2\pi\Delta x/P$.

The light beam R+1 which has been +1st-order diffracted by the first diffraction grating G1 is once condensed at the position C in the direction of the grating lines of the first diffraction grating G1, is reflected and diffracted at a point P2 on the second diffraction grating G2 and is divided into −1st-order diffracted light R+1−1, 0-order diffracted light R+10 and other light beams, which are phase-modulated, and of these, only the −1st-order diffracted light R+1−1 taken out perpendicularly from the second diffraction grating G2 is utilized. The phase of the −1st-order diffracted light R+1−1 shifts by $-2\pi\Delta x/P$ and this diffracted light enters the third diffraction grating G3, and the phase of the wave surface of the 0-order diffracted light R+1−10 which has intactly rectilinearly travelled therethrough is $-2\pi\Delta x/P$.

The light beam R+1−10 and light beam R0+1−1 having had their optical paths superposed one upon the other by the third diffraction grating G3 become interfering light and enter the light receiving element 3. The interference phase at this time is $$\{+2\pi\Delta x/P\}-\{-2\pi\Delta x/P\}=4\pi\Delta x/P$$

and when the second diffraction grating G2 which is a scale shifts by P/2 pitch in the direction of arrangement of the grating, a light-and-shade signal of a period is created. This light-and-shade signal is detected by the light receiving element 3, and displacement information is obtained in the signal processor 31. This processing step is well known and therefore need not be described herein.

Description will now be made of the relations among attaching error angles $\phi$, $\eta$, the angle difference $\theta$ between interfering two light beams and the wavelength $\lambda$ of light/the pitch P of the diffraction grating.

When in FIG. 11, the vector of a ray transmitted through the lens 4 and entering the first diffraction grating G1 perpendicularly thereto, of the light emitted from the light emitting source, is u0 (u0x, u0y, u0z) and m is the diffraction order number, it is known that the direction vector u1 (u1x, u1y, u1z) of the mth-order light transmitted through and diffracted by the first diffraction grating G1 satisfies the following relations (Px and Py are the pitches of the grating in x- and y-directions, respectively, and the grating is present in x-y plane).

1) u1x=u0x+mλ/Px
   u1y=u0y +mλ/Py
   u0x²+u0y²+u0z²=1
   u1x²+u1y²+u1z²=1

The relation with the angle difference $\theta$ between the two light beams R+1−1 and R0+1 −1 transmitted through and diffracted by the third diffraction grating G3 and interfering with each other, with the above-mentioned relation as the basis, is as follows:

(Here, λ/P=s)

θ=Cos−1{(2s)²(Cosη−1)+1}

θ=−φ−Sin−1{s+Sin[φ−Sin−1(s)]}

+Sin−1{s+Sin[φ−Sin−1(s−Sinφ)]} when here, $\theta$ and $\phi$ are minute angles and the approximation up to the second order is taken, 2) θ=2sη (η: azimuth angle)
3) θ=sφ²/[(1−s2)^{1/2}] (φ: rotation angle)

Also, when the azimuth angle η of FIG. 4 is given, the angle θ between the interfering two light beams R+1−10 and R0+1−1 is created in the y-z plane of FIG. 11 (see FIG. 5) and when the rotation angle φ of FIG. 6 is given, the angle difference θ is created in the x-z plane of FIG. 11 (see FIG. 7). This relation is shown in FIGS. 9A and 10A, and when λ=0.78 μm and P=1.6 μm, the relation becomes such as shown in FIGS. 9B and 10B.

Figure 13A:
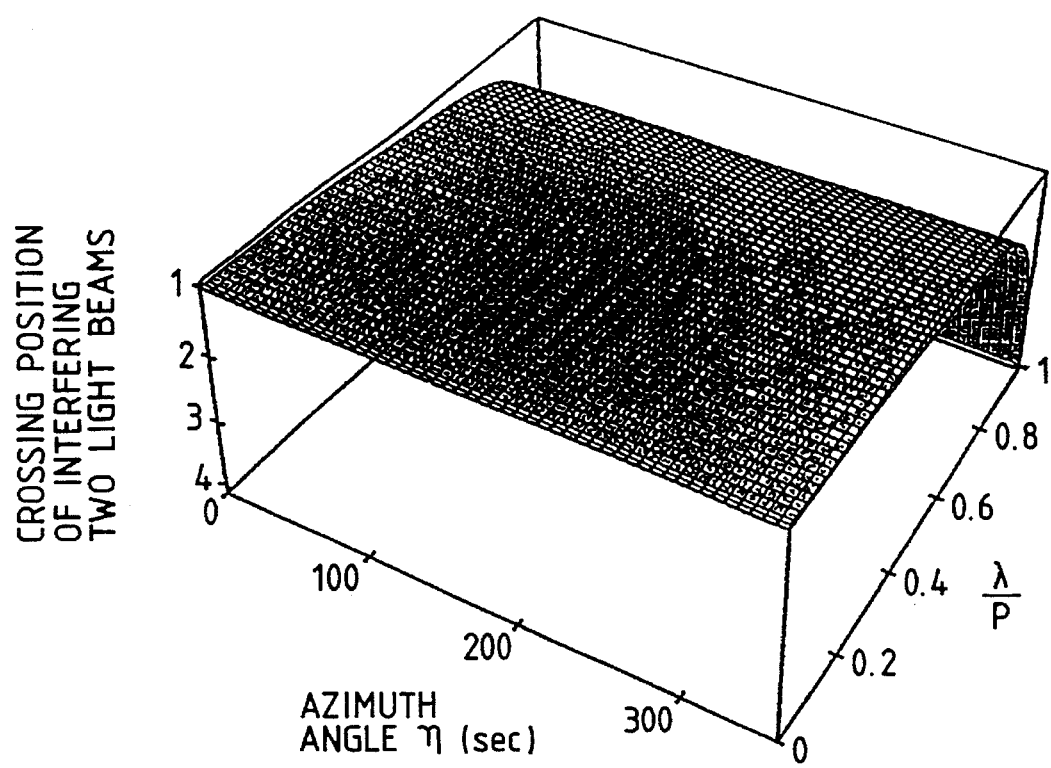
FIGS. 13A and 13B show the relation (the wavelength/the pitch of the grating) between the crossing position of interfering two light beams and the azimuth angle when the head portion and the scale portion give rise to the attaching error of the azimuth angle.
Figure 14A:
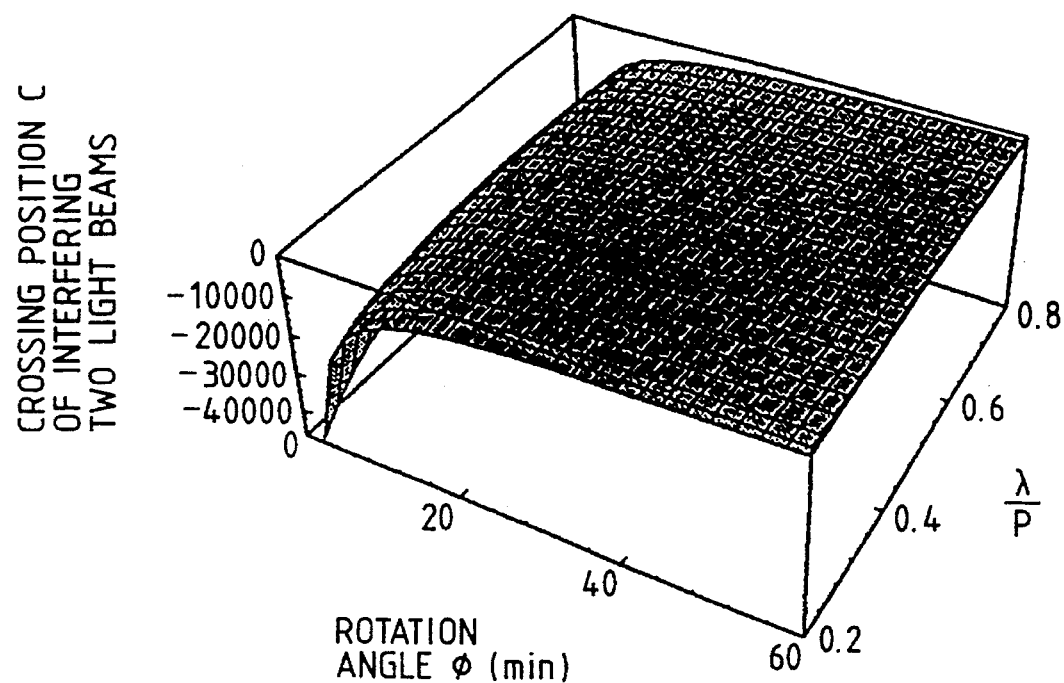
FIGS. 14A and 14B show the relation (of the wavelength/ the pitch of the grating) between the crossing position of interfering two light beams and the azimuth angle when the head portion and the scale portion give rise to the attaching error of the rotation angle.

Next, when the second diffraction grating G2 has given rise to an attaching error, the crossing position C of the interfering two light beams R+1−10 and R0+1−1 as viewed from the sensor is found. When by the use of the above-mentioned relations 1) to 3), the optical path length L2 (see FIGS. 12A and 12B) from the second diffraction grating G2 to the third diffraction grating G3 is evaluated as a unit length, the crossing position C when the second diffraction grating G2 receives the azimuth angle η of FIG. 4 is such as shown in FIG. 13A, and when the second diffraction grating G2 receives the rotation angle φ of FIG. 6, the crossing position C is such as shown in FIG. 14A. The signs of the crossing position C are such that with the third diffraction grating G3 as the origin, the direction of the sensor is defined as minus and the direction of the second diffraction grating G2 is defined as plus.

That is, when the second diffraction grating G2 creates the azimuth angle η, the interfering two light beams are separated in the direction of the grating lines of the third diffraction grating G3, and when the interfering two light beams are seen from the surface of the sensor toward the third diffraction grating G3, they cross each other near the second diffraction grating G2. This crossing position C is a position corresponding to (L1+L2)/2 (L1 is the optical path length difference from the first diffraction grating G1 to the second diffraction grating G2).

Figure 13B:
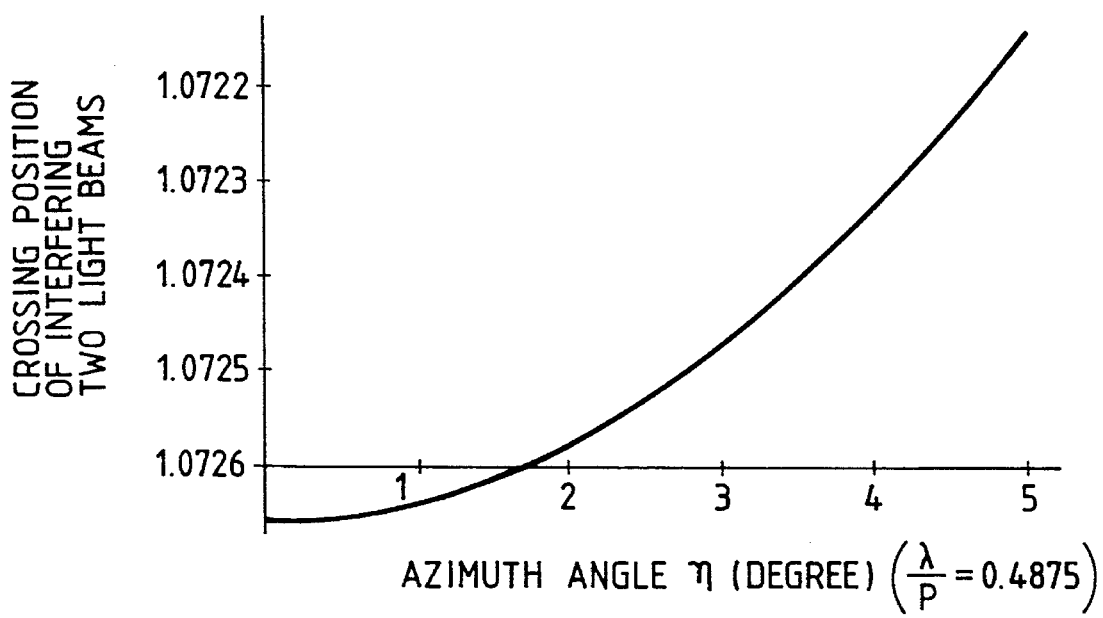
Figure 14B:
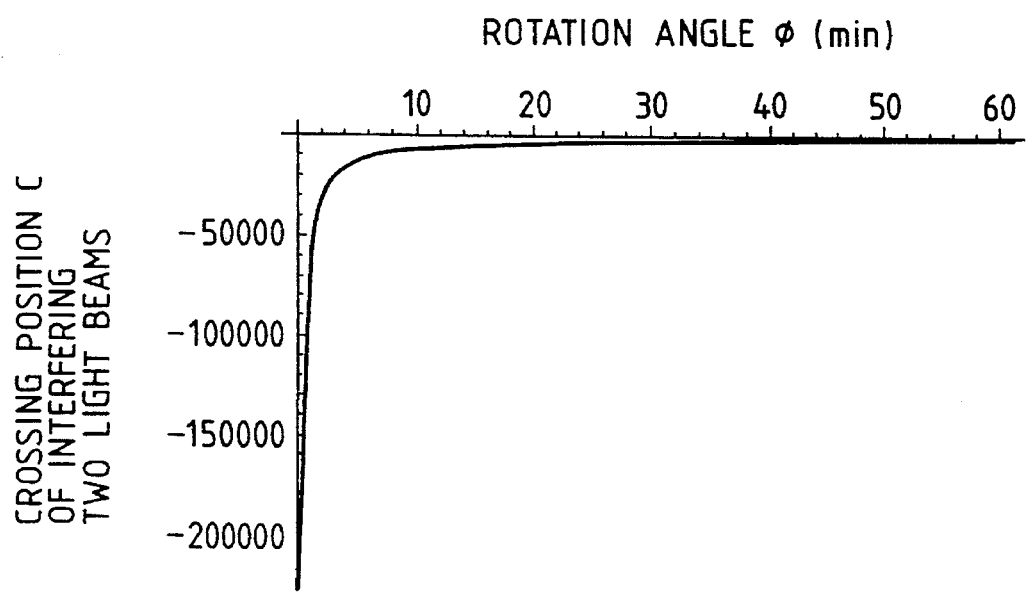

Also, when the third diffraction grating G3 creates the rotation angle ϕ, the interfering two light beams are separated in the direction of the grating arrangement of the third diffraction grating G3, and when the interfering two light beams are seen toward the direction opposite to the direction in which the third diffraction grating G3 lies, as viewed from the surface of the sensor, they look like crossing at a very far point. When P=1.6 μm and λ=0.78 μm, the crossing position C of the interfering two light beams is such as shown in FIGS. 13B and 14B.

So, in order to stabilize the interfering state of the two light beams, design is made such that the two light beams are condensed near the second diffraction grating 2 in the direction of the grating lines of the first diffraction grating G1 (this condensed position is made the same as the crossing position C of FIG. 11, that is, the position of L3=(L1+L2)/2) and with respect to the direction of the grating arrangement of the first diffraction grating G1, they become parallel lights (plane wave) or a spherical wave having a very large radius of curvature (in this case, the divergent light from the light emitting element).

As can be seen from FIGS. 10A and 10B, even if the rotation angle ϕ is given to the second diffraction grating G2, the angle difference θ between the interfering two light beams will be little given, but the two light beams will be separated from each other. Therefore, if in this direction, the two light beams become a spherical wave having a small radius of curvature, interference fringes will become liable to rise and the interfering state will become unstable, but if the two light beams are a spherical wave having a very large radius of curvature (a spherical wave having so large a radius of curvature that it can be regarded as a plane wave), the angle difference θ between the two light beams will not become very great and therefore, interference fringes will not be liable to rise and the interfering state will become stable.

Also, with respect to the direction of the grating lines of the first diffraction grating G1, as can be seen from FIGS. 13A and 13B, the crossing position C of the two light beams is substantially constant in the area of λ/P<0.8, irrespective of the azimuth angle η, but from FIGS. 9A and 9B, the angle difference θ between the interfering two light beams, if they are given the azimuth angle η, will be given in proportion thereto.

This is the same thing as the fact that when the direction to condense the light beam emitted from the light emitting source is the direction of the grating lines of the first diffraction grating G1 and the condensing position is the same area as the crossing position C of the interfering two light beams, the wave surfaces of the two light beams overlap each other even independently of the angle difference θ being great and the optical path lengths l1 and l2 always become constant independently of the azimuth angle η. Therefore, interference fringes become not liable to arise and the interfering state becomes stable.

The present embodiment is one in which, for the reason set forth above, the divergent light from the light source is used in the direction of the grating arrangement of the first diffraction grating G1 and the radius of curvature of the light beam is made as large as possible and the convergent light is used in the direction of the grating lines to thereby construct a readily attachable encoder of which the output is insensitive to the rotation angle and azimuth angle.

[Embodiment 2]

Figure 15:
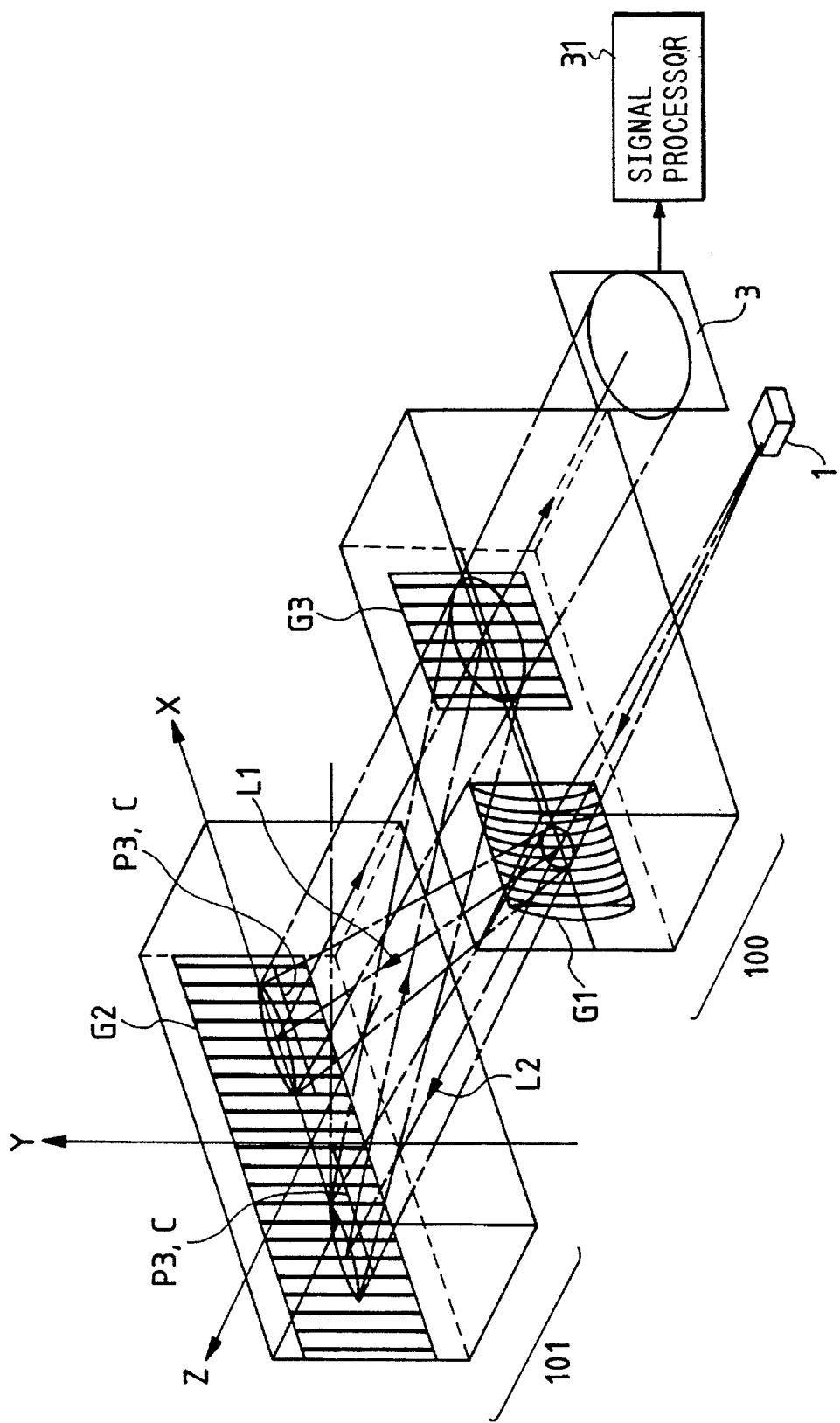
FIG. 15 is a perspective view showing Embodiment 2 of the optical type displacement sensor according to the present invention.
Figure 16:
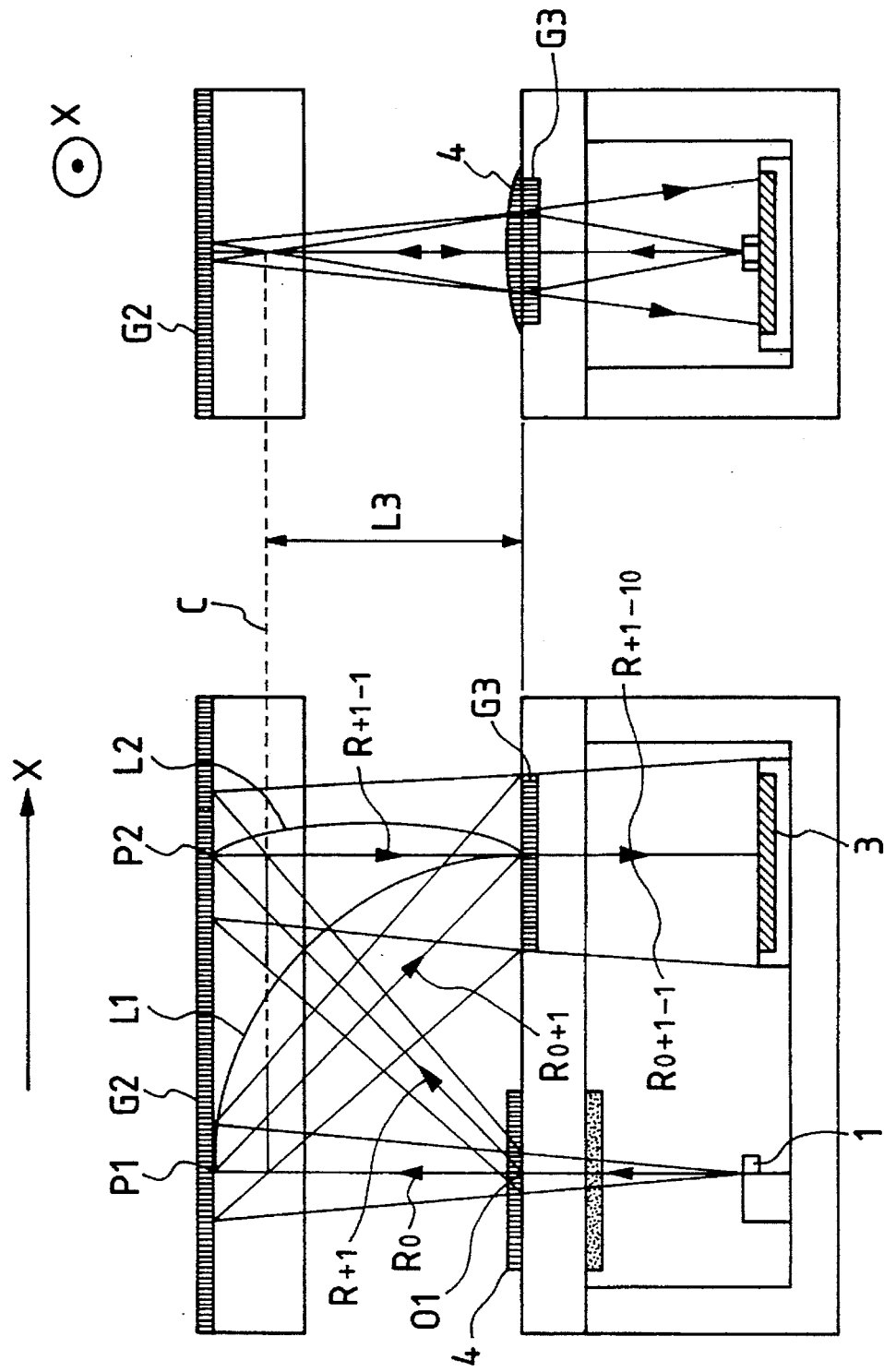
FIGS. 16A and 16B are a top plan view and a side view, respectively, showing an optical path in Embodiment 2.

FIG. 15 is a perspective view showing Embodiment 2 of the optical type displacement sensor according to the present invention, and FIGS. 16A and 16B are a top plan view and a side view, respectively, showing an optical path therein. In FIGS. 15, 16A and 16B, the reference numeral 1 designates a light emitting element, the reference numeral 3 denotes a light receiving element, the reference character G2 designates a second diffraction grating which is a scale for phase-modulating divided light beams, the reference character G3 denotes a third diffraction grating for combining the light beams, and the reference character 4 designates an optical element in which there are constructed a cylindrical lens for condensing a divergent light beam emitted from the light emitting element 1 and a first diffraction grating G1 for dividing the light beam on the lens surface of the cylindrical lens.

The principle and basic construction of the optical system are the same as those of the aforedescribed Embodiment 1, and the light beam emitted from the light emitting element 1 is condensed and divided by a single optical element 4.

According to Embodiment 2, the lens for condensing and dividing the light beam emitted from the light emitting element 1 and the first diffraction grating G1 are provided by a single optical element comprising the cylindrical lens and the first diffraction grating G1 constructed on the lens surface thereof and therefore, it becomes possible to provide the optical element as by molding on a base plate on which the first diffraction grating G1 and the third diffraction grating G3 are provided, and it becomes possible to construct an encoder as an optical type displacement sensor of small size and low cost which is simple in structure and which does not require the alignment between the grating arrangement of the first diffraction grating G1 and the lens during assembly and which is easy to assemble.

[Embodiment 3]

Figure 17:
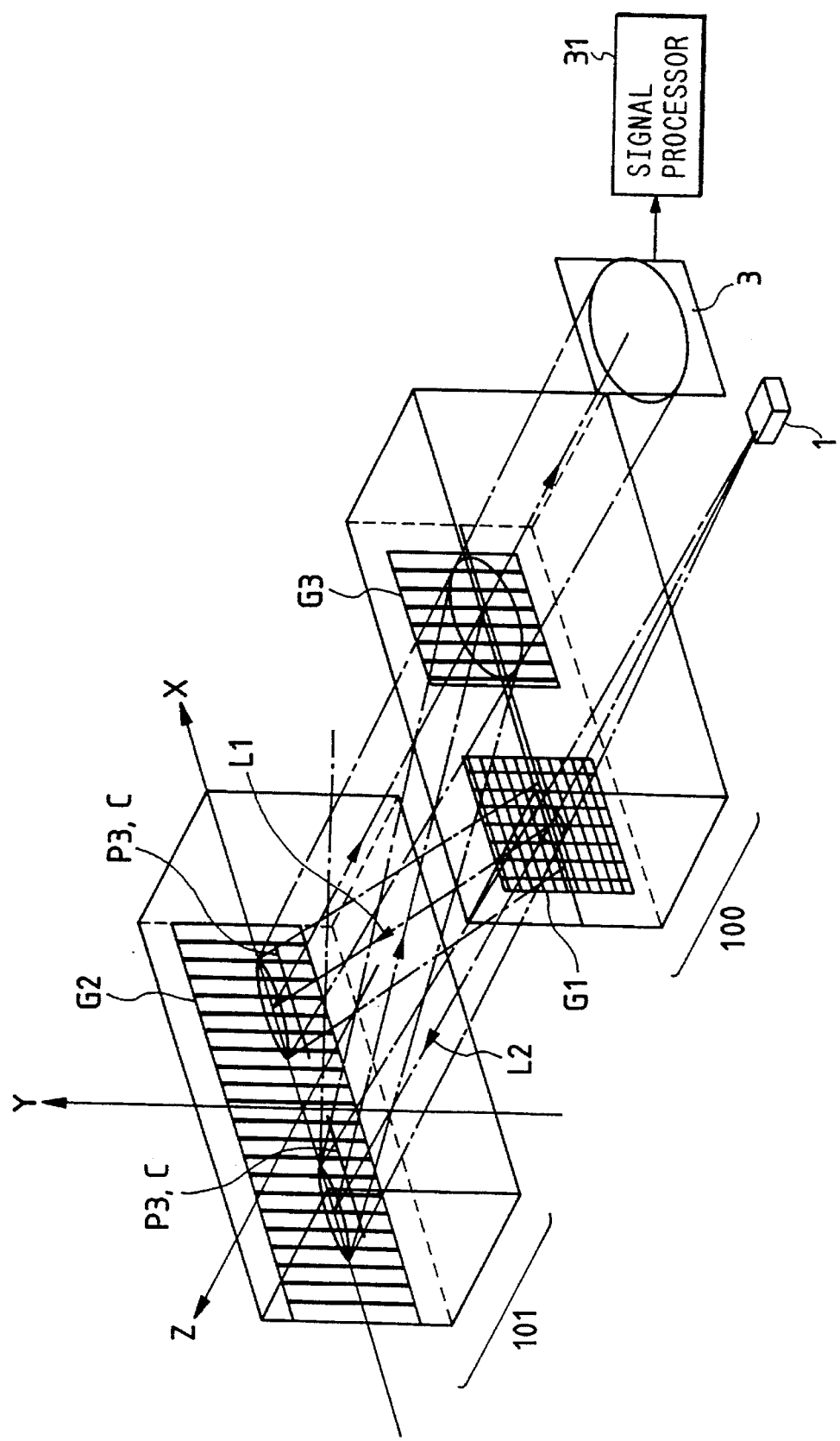
FIG. 17 is a perspective view showing Embodiment 3 of the optical type displacement sensor according to the present invention.
Figure 18B:
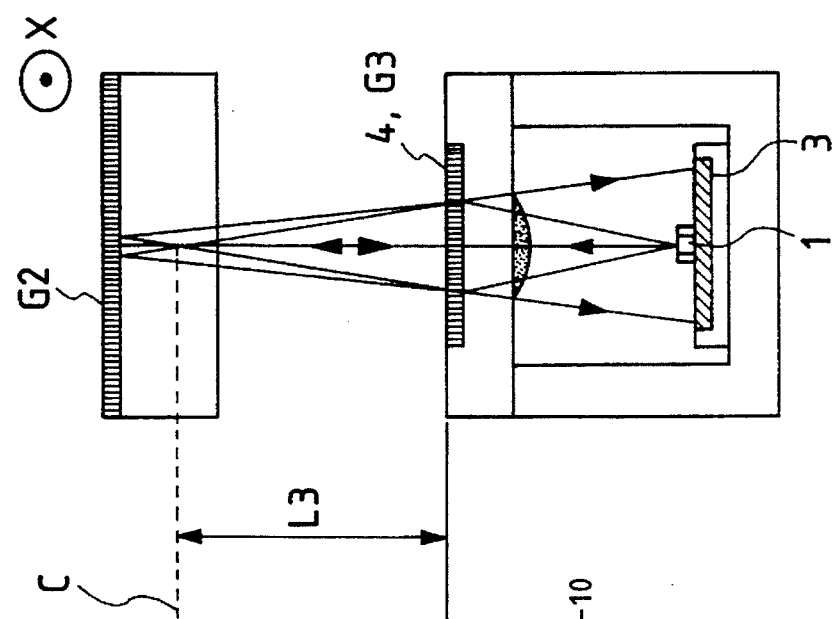
FIGS. 18A and 18B are a top plan view and a side view, respectively, showing an optical path in Embodiment 3.
Figure 18A:
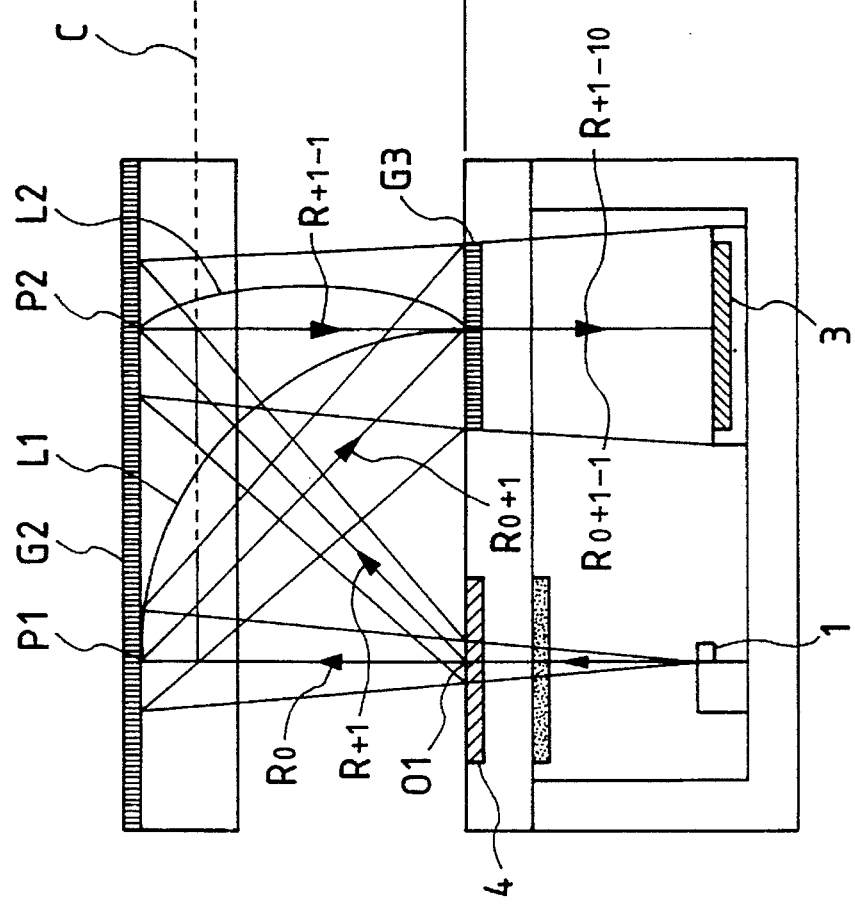

FIG. 17 is a perspective view showing Embodiment 3 of the optical type displacement sensor according to the present invention, and FIGS. 18A and 18B are a top plan view and a side view, respectively, showing an optical path therein.

In FIGS. 17, 18A and 18B, the reference numeral 1 designates a light emitting element, the reference numeral 3 denotes a light receiving element, the reference character G1 designates a hologram for condensing a divergent light beam emitted from the light emitting element only in the direction of the grating lines of a third diffraction grating G3 and for dividing the light beam in the direction of the grating arrangement of the third diffraction grating G3, the reference character G2 denotes a second diffraction grating which is a scale for phase-modulating the divided light beams, and G3 designates a third diffraction grating for combining the light beams.

The principle and basic construction of the optical system are the same as those of the aforedescribed Embodiment 1, and the light beam emitted from the light emitting element 1 is condensed and divided by an optical element (hologram).

According to Embodiment 3, the lens for condensing and collimating the light and the first diffraction grating G1 are provided by a single optical element (zone plate) and therefore, it becomes possible to provide them as by molding on a base plate on which the first diffraction grating G1 and the third diffraction grating G3 are provided, and it becomes possible to construct an encoder as an optical type displacement sensor of small size and low cost which is simple in structure and which does not require the alignment between the grating arrangement of the first diffraction grating G1 and the lens during assembly and which is easy to assemble.

[Embodiment 4]

Figure 19:
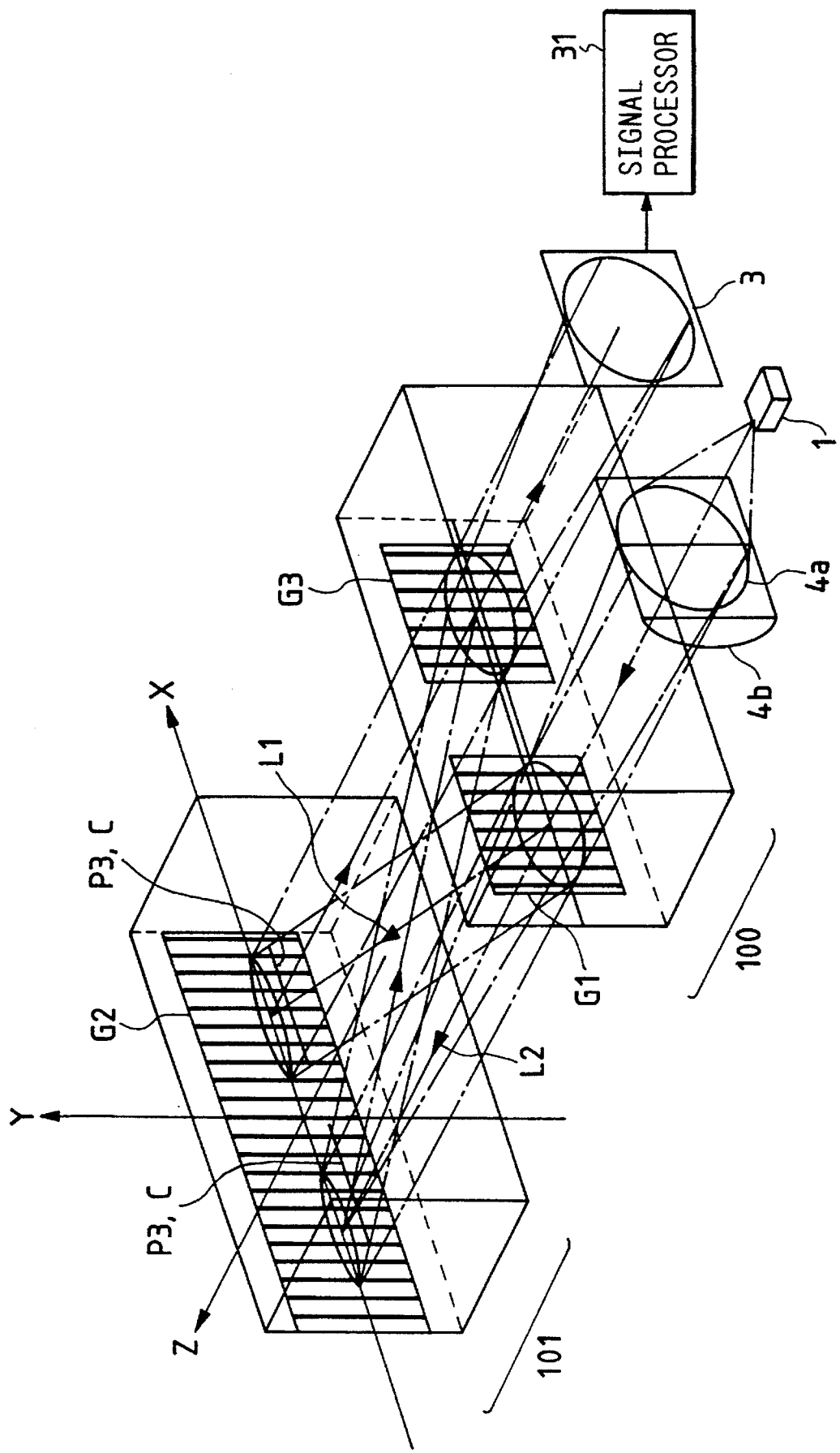
FIG. 19 is a perspective view showing Embodiment 4 of the optical type displacement sensor according to the present invention.
Figure 20B:
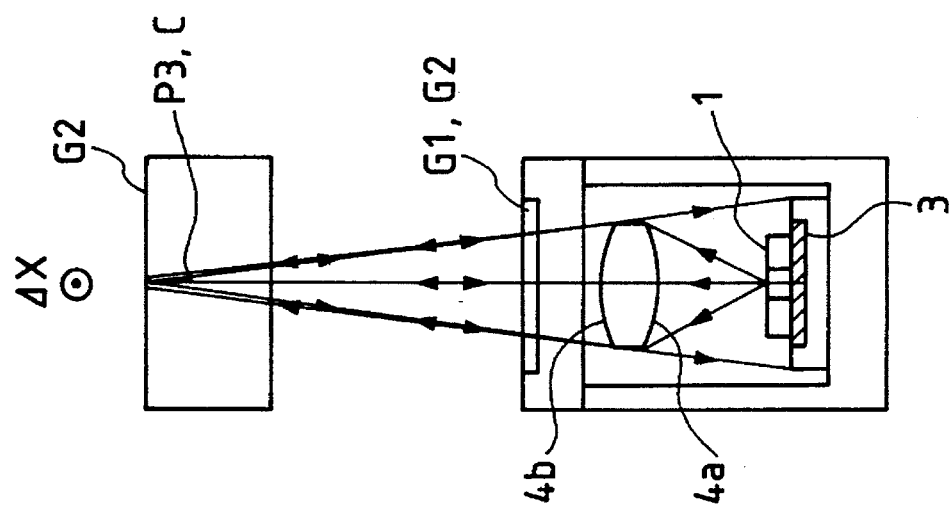
FIGS. 20A and 20B are a top plan view and a side view, respectively, showing an optical path in Embodiment 4.
Figure 20A:
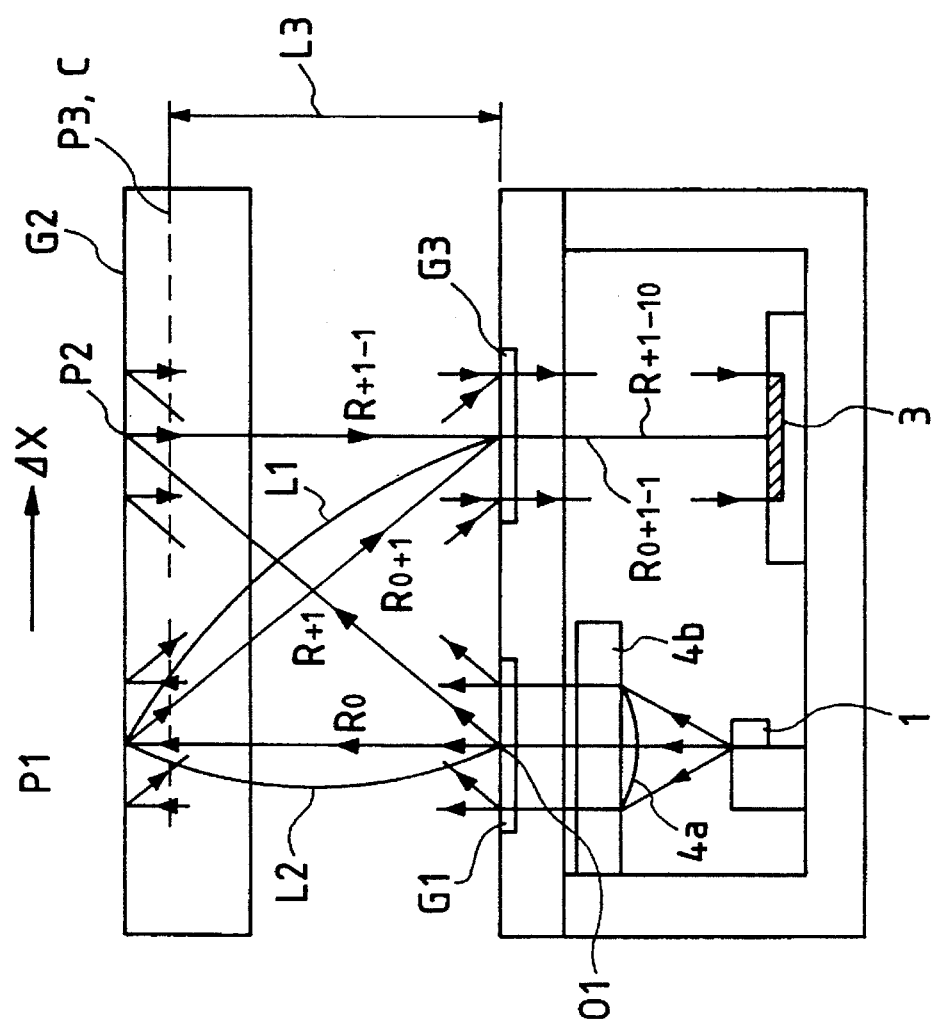

FIG. 19 is a perspective view showing Embodiment 4 of the optical type displacement sensor according to the present invention, and FIGS. 20A and 20B are a top plan view and a side view, respectively, showing an optical path therein. In these figures, the same portions as those in FIGS. 11, 12A and 12B are given the same reference characters and need not be described. In FIGS. 19, 20A and 20B, the reference character 4a designates a collimator lens for substantially collimating the light beam emitted from the light emitting element, and the reference character 4b denotes a cylindrical lens for condensing the light beam collimated by the collimator lens 4a only in the direction of the grating arrangement of the first diffraction grating G1.

The principle of Embodiment 4 will hereinafter be described. The divergent light beam emitted from the light emitting element 1 is substantially collimated by the collimator lens 4a, is converged in the direction of the grating lines of the diffraction grating G1 by the cylindrical lens 4b, is transmitted and diffracted at a point 01 on the diffraction grating G1, is divided into 0-order diffracted light R0, +1st-order diffracted light R+1 and −1st-order diffracted light and emerges, and only the 0-order diffracted light R0 and +1st-order diffracted light R+1 are utilized. The other operations of the present embodiment are similar to those of the aforedescribed Embodiment 1 and therefore need not be described.

[Embodiment 5]

Figure 21:
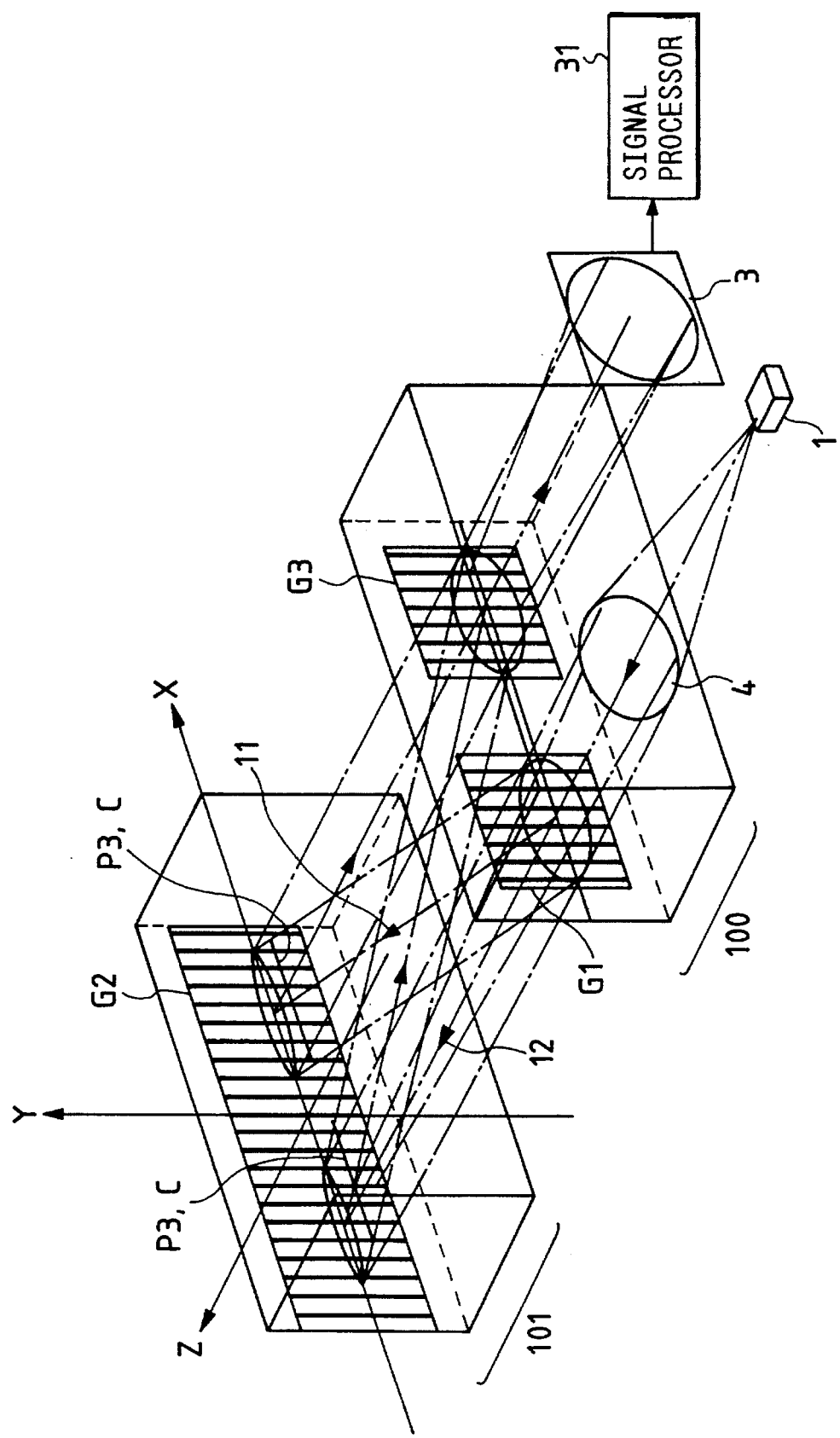
FIG. 21 is a perspective view showing Embodiment 5 of the optical type displacement sensor according to the present invention.
Figure 22B:
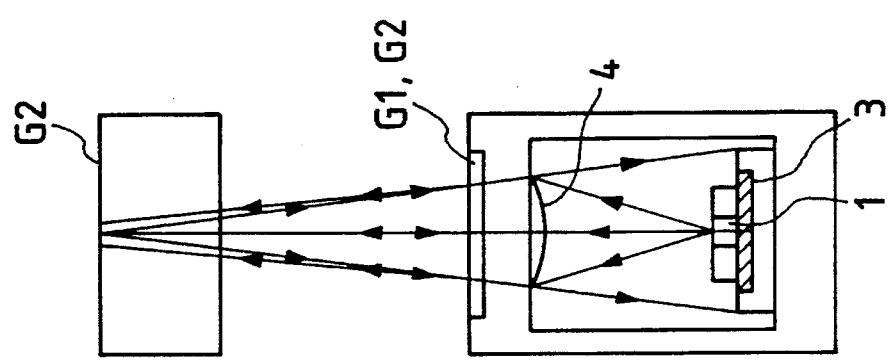
FIGS. 22A and 22B are a top plan view and a side view, respectively, showing an optical path in Embodiment 5.
Figure 22A:
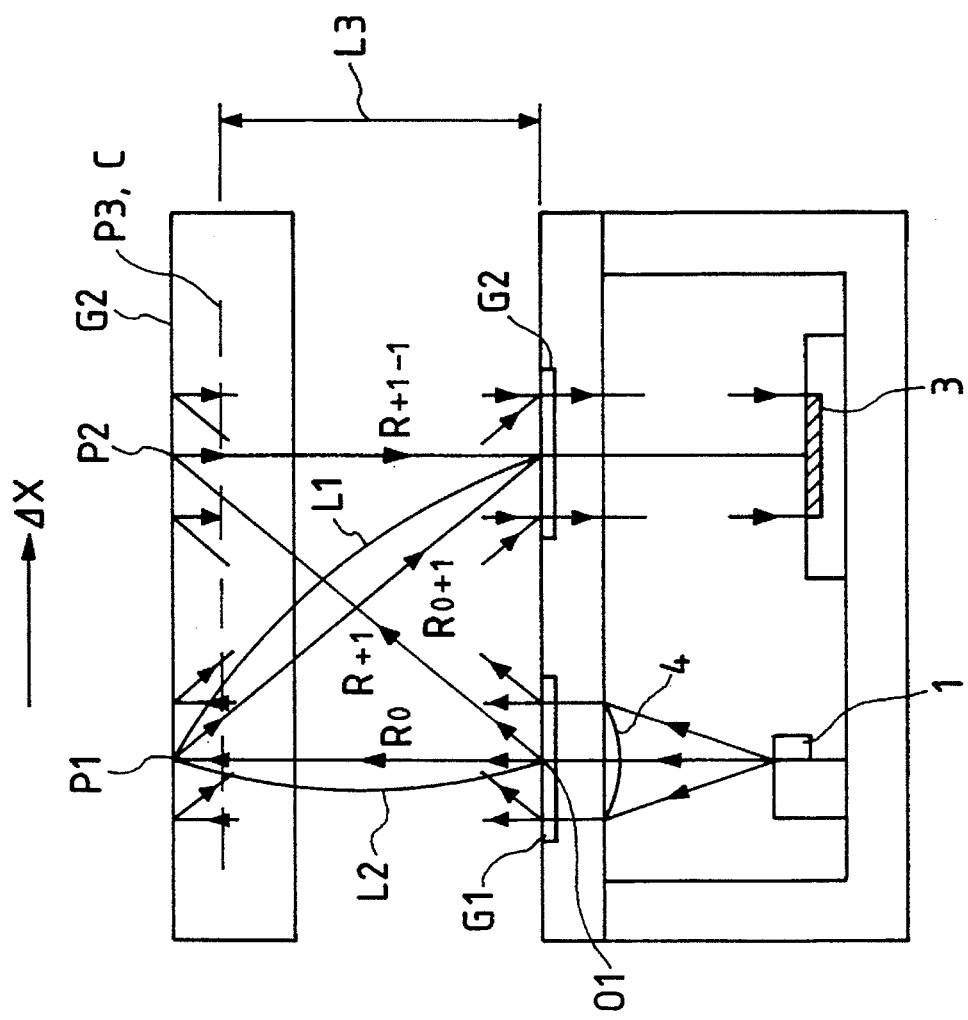

FIG. 21 is a perspective view showing Embodiment 5 of the optical type displacement sensor according to the present invention, and FIGS. 22A and 22B are a top plan view and a side view, respectively, showing an optical path therein. In FIGS. 21, 22A and 22B, the reference character 4C designates a toric lens for substantially collimating the light beam emitted from the light emitting element in the direction of the grating are arrangement of the diffraction grating G1 and for condensing the light beam in the direction of the grating lines of the diffraction grating G1. In the other points, the construction of the present embodiment is the same as that of Embodiment 2 shown in FIGS. 15, 16A and 16B are therefore, the same portions in the present embodiment as those in Embodiment 2 are given the same reference characters and need not be described.

The principle and basic construction of the optical system are the same as those of Embodiment 2, and the light beam emitted from the light emitting element 1 is condensed and collimated by a single lens.

According to Embodiment 5, the lens for condensing and collimating the light beam is a single toric lens and therefore, it becomes possible to provide it as by molding on a base plate on which the first diffraction grating G1 and the third diffraction grating G3 are provided, and it becomes possible to construct an encoder of small size and low cost which is simple in structure and which does not require the alignment between the grating arrangement of the first diffraction grating and the lens during assembly and which is easy to assemble.

[Embodiment 6]

An effect similar to that of the above-described Embodiments 1 to 5 can also be obtained by using optical means such as a Fresnel lens and two cylindrical lenses as the optical means for condensing and collimating the light beam emitted from the light emitting element 1.

What is claimed is:

1. An apparatus for measuring relative displacement information between said apparatus and scale means on which a diffraction grating is formed, comprising:

light source means;

separating means for separating a light beam from said light source means into a plurality of light beams;

wave combining means for wave-combining diffracted lights of said plurality of light beams separated by said separating means which are diffracted by said diffraction grating;

light receiving means for receiving interfering lights by the plurality of light beams wave-combined by said wave combining means, the relative displacement information between said apparatus and said scale means being measured by the light reception of said light receiving means; and optical means for (i) collimating said plurality of light beams or forming a spherical wave having so large a radius of curvature that it is substantially a plane wave of said plurality of light beams in a direction of light beam separation of said separating means, and (ii) condensing said plurality of light beams in an optical path which is from said separating means to said wave combining means, in a direction perpendicular to said direction of light beam separation.

2. An apparatus according to claim 1, wherein said separating means and said wave combining means each have a diffraction grating formed on the same member.

3. An apparatus according to claim 2, wherein said separating means and said wave combining means are disposed at a position opposed to the diffraction grating of said scale means.

4. An apparatus according to claim 1, wherein said optical means has a cylindrical lens.

5. An apparatus according to claim 4, wherein said separating means has a diffraction grating provided on said cylindrical lens.

6. An apparatus according to claim 1, wherein said separating means and said optical means share a zone plate.

7. An apparatus according to claim 1, wherein said optical means has a collimator lens and a cylindrical lens.

8. An apparatus according to claim 1, wherein said optical means has a toric lens.

9. An apparatus according to claim 1, wherein said optical means condenses said plurality of light beams near said diffraction grating in a direction perpendicular to said direction of light beam separation.

10. An apparatus according to claim 1, wherein said optical means condenses said plurality of light beams at the substantially central position of the optical path length from said separating means to said wave combining means in a direction perpendicular to said direction of light beam separation.

11. An apparatus for measuring relative displacement information between said apparatus and scale means on which a diffraction grating is formed, comprising:

a light emitting element;

a separating diffraction grating for separating a light beam from said light emitting element into a plurality of light beams;

a wave combining diffraction grating for wave-combining diffracted lights of the plurality of light beams separated by said separating diffraction grating which are diffracted by said diffraction grating;

a light receiving element for receiving interfering lights by the plurality of light beams wave-combined by said wave combining diffraction grating;

a signal processor for receiving a signal from said light receiving element to thereby detect the relative displacement information between said apparatus and said scale means; and at least one optical element for (i) collimating said plurality of light beams or forming a spherical wave having so large a radius of curvature that it is substantially a plane wave of said plurality of light beams in a direction of light beam separation of said separating diffraction grating, and (ii) condensing said plurality of light beams in an optical path which is from said separating diffraction grating to said wave combining diffraction grating, in a direction perpendicular to said direction of light beam separation.

12. An apparatus according to claim 11, wherein said separating diffraction grating and said wave combining diffraction grating are formed on the same member.

13. An apparatus according to claim 12, wherein said separating diffraction grating and said wave combining diffraction grating are disposed at a position opposed to said diffraction grating.

14. An apparatus according to claim 11, wherein said optical element is a cylindrical lens.

15. An apparatus according to claim 14, wherein said separating diffraction grating is formed on a surface of said cylindrical lens.

16. An apparatus according to claim 11, wherein said optical element and said separating diffraction grating are the same hologram.

17. An apparatus according to claim 11, wherein said optical element is a collimator lens and a cylindrical lens.

18. An apparatus according to claim 11, wherein said optical element is a toric lens.

19. An apparatus according to claim 11, wherein said optical element condenses said plurality of light beams near said diffraction grating in a direction perpendicular to said direction of light beam separation.

20. An apparatus according to claim 11, wherein said optical element condenses said plurality of light beams at a substantially central position of the optical path length from said separating diffraction grating to said wave combining diffraction grating in a direction perpendicular to the direction of light beam separation.

* * * * *

UNITED STATES PATENT AND TRADEMARK OFFICE
CERTIFICATE OF CORRECTION

PATENT NO. : 5,621,527

DATED : April 15, 1997

INVENTOR(S) : Kaneda et al.

It is certified that error appears in the above-indentified patent and that said Letters Patent is hereby corrected as shown below:

On the title page, item

[54] TITLE:

Line 3, "WHICH" should read --ON WHICH--.

[56] REFERENCES CITED:

FOREIGN PATENT DOCUMENTS

"1180615  12/1989  Japan
 3279812  12/1991  Japan" should read
--1-180615  12/1989  Japan
  3-279812  12/1991  Japan--.

COLUMN 1:

Line 3, "WHICH" should read --ON WHICH--.

COLUMN 4:

Line 27, "at" should read --an--.

UNITED STATES PATENT AND TRADEMARK OFFICE
CERTIFICATE OF CORRECTION

PATENT NO. : 5,621,527
DATED : April 15, 1997
INVENTOR(S) : Kaneda et al.

It is certified that error appears in the above-indentified patent and that said Letters Patent is hereby corrected as shown below:

COLUMN 9:

Line 52, "4C" should read --4--;
Line 59, "are" should read --and--; and
Line 61, "are given" should read --are to be given--.

Signed and Sealed this

Third Day of March, 1998

Attest:

BRUCE LEHMAN

Attesting Officer        Commissioner of Patents and Trademarks